US012377867B2

(12) United States Patent
Santoni et al.

(10) Patent No.: US 12,377,867 B2
(45) Date of Patent: Aug. 5, 2025

(54) INDEPENDENT SAFETY MONITORING OF AN AUTOMATED DRIVING SYSTEM

(71) Applicant: Intel Corporation, Santa Clara, CA (US)

(72) Inventors: Umberto Santoni, Scottsdale, AZ (US); Riccardo Mariani, Calci (IT); John Weast, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 16/579,376

(22) Filed: Sep. 23, 2019

(65) Prior Publication Data

US 2020/0017114 A1 Jan. 16, 2020

(51) Int. Cl.
| B60W 50/023 | (2012.01) |
| B60W 50/02 | (2012.01) |
| G05D 1/00 | (2024.01) |
| G06F 11/16 | (2006.01) |
| G07C 5/08 | (2006.01) |

(52) U.S. Cl.
CPC ...... B60W 50/023 (2013.01); B60W 50/0205 (2013.01); G05D 1/0055 (2013.01); G05D 1/0088 (2013.01); G06F 11/1641 (2013.01); G07C 5/0816 (2013.01); B60W 2050/021 (2013.01)

(58) Field of Classification Search
CPC ........... B60W 50/023; B60W 50/0205; B60W 2050/021; G05D 1/0055; G05D 1/0088; G06F 11/1641; G07C 5/0816
See application file for complete search history.

(56) References Cited

U.S. PATENT DOCUMENTS

| 10,776,195 B2 * | 9/2020 | Menzel | G01C 21/28 |
| 2018/0370540 A1 * | 12/2018 | Yousuf | B60W 10/04 |
| 2019/0258251 A1 * | 8/2019 | Ditty | G05D 1/0274 |
| 2019/0283768 A1 * | 9/2019 | Das | B60W 30/10 |
| 2019/0340116 A1 * | 11/2019 | Miyauchi | G06F 11/203 |

* cited by examiner

Primary Examiner — Aniss Chad
Assistant Examiner — Stephanie T Su
(74) Attorney, Agent, or Firm — Alliance IP, LLC

(57) ABSTRACT

An automated driving system includes a security companion subsystem to access data generated at a compute subsystem of the automated driving system, which indicates a determination by the compute subsystem associated with an automated driving task. The security companion subsystem determines whether the determination is safe based on the data. The security companion subsystem is configured to realize a higher safety integrity level than the compute subsystem.

20 Claims, 12 Drawing Sheets

INDEPENDENT SAFETY MONITORING OF AN AUTOMATED DRIVING SYSTEM

TECHNICAL FIELD

This disclosure relates in general to the field of computer systems and, more particularly, to computing systems enabling autonomous vehicles.

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

BRIEF DESCRIPTION OF THE DRAWINGS

Like reference numbers and designations in the various drawings indicate like elements.

DESCRIPTION OF EXAMPLE EMBODIMENTS

Figure 1:
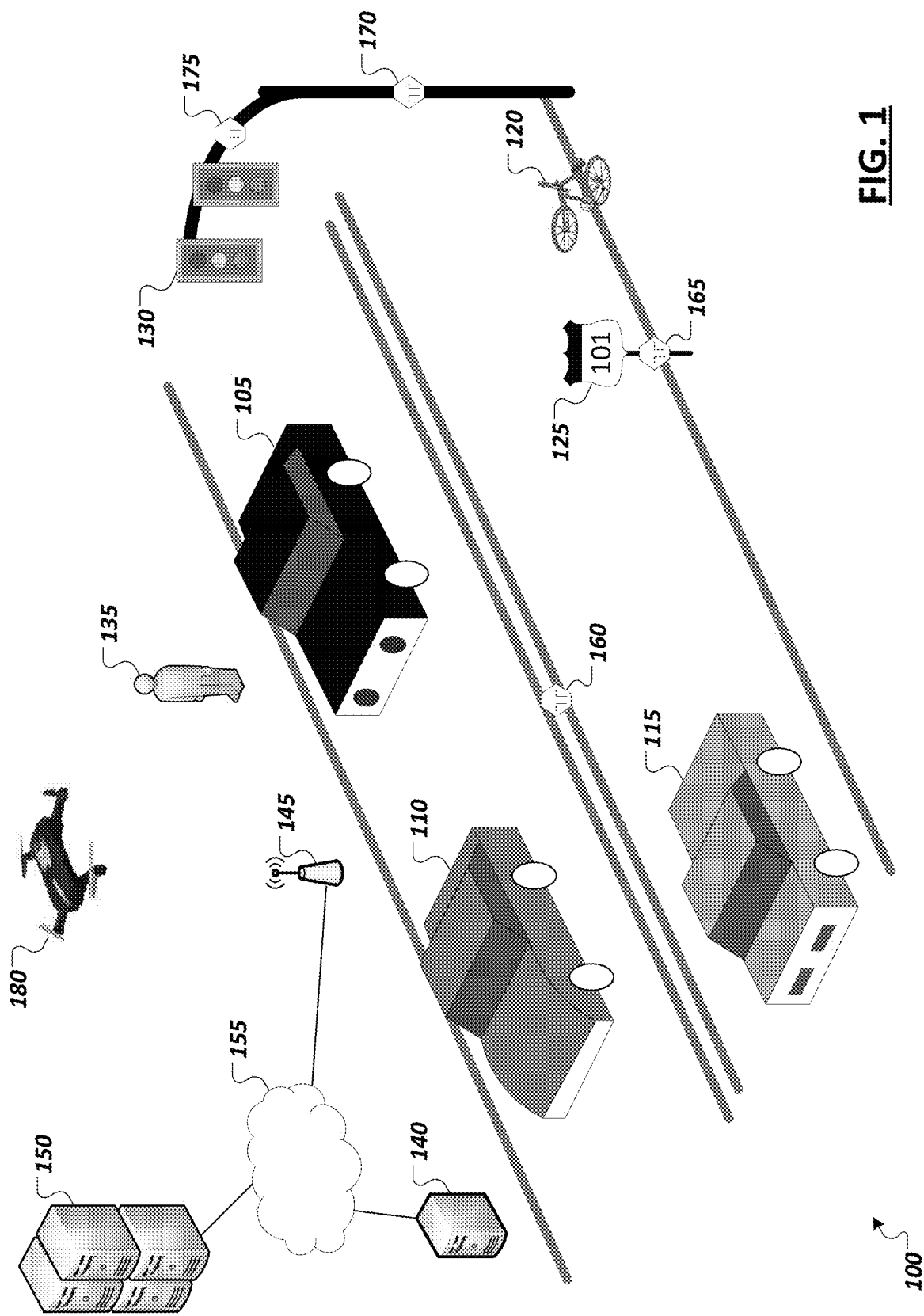
FIG. 1 is a simplified block diagram of an example driving environment.

FIG. 1 is a simplified illustration 100 showing an example autonomous driving environment. Vehicles (e.g., 105, 110, 115, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road actors (e.g., pedestrians (e.g., 135), bicyclists, etc.), detect obstacles and hazards (e.g., 120), and road conditions (e.g., traffic, road conditions, weather conditions, etc.), and adjust control and guidance of the vehicle accordingly.

In some implementations, vehicles (e.g., 105, 110, 115) within the environment may be "connected" in that the in-vehicle computing systems include communication modules to support wireless communication using one or more technologies (e.g., IEEE 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth™, millimeter wave (mmWave), ZigBee™, Z-Wave™, etc.), allowing the in-vehicle computing systems to connect to and communicate with other computing systems, such as the in-vehicle computing systems of other vehicles, roadside units, cloud-based computing systems, or other supporting infrastructure. For instance, in some implementations, vehicles (e.g., 105, 110, 115) may communicate with computing systems providing sensors, data, and services in support of the vehicles' own autonomous driving capabilities. For instance, as shown in the illustrative example of FIG. 1, supporting drones 180 (e.g., ground-based and/or aerial), roadside computing devices (e.g., 140), various external (to the vehicle, or "extraneous") sensor devices (e.g., 160, 165, 170, 175, etc.), and other devices may be provided as autonomous driving infrastructure separate from the computing systems, sensors, and logic implemented on the vehicles (e.g., 105, 110, 115) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 1, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 160, 165, 170, 175) may be provided, which include sensors for observing portions of roadways and vehicles moving within the environment and generating corresponding data describing or embodying the observations of the sensors. As examples, sensor devices may be embedded within the roadway itself (e.g., sensor 160), on roadside or overhead signage (e.g., sensor 165 on sign 125), sensors (e.g., 170, 175) attached to electronic roadside equipment or fixtures (e.g., traffic lights (e.g., 130), electronic road signs, electronic billboards, etc.), dedicated road side units (e.g., 140), among other examples. Sensor devices may also include communication capabilities to communicate their collected sensor data directly to nearby connected vehicles or to fog- or cloud-based computing systems (e.g., 140, 150). Vehicles may obtain sensor data collected by external sensor devices (e.g., 160, 165, 170, 175, 180), or data embodying observations or recommendations generated by other systems (e.g., 140, 150) based on sensor data from these sensor devices (e.g., 160, 165, 170, 175, 180), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road actors, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 140, 150), other sensor devices (e.g., 160, 165, 170, 175, 180), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 140, 150). For instance, a connected vehicle may communicate with roadside units, edge systems, or cloud-based devices (e.g., 140) local to a particular segment of roadway, with such devices (e.g., 140) capable of providing data (e.g., sensor data aggregated from local sensors (e.g., 160, 165, 170, 175, 180) or data reported from sensors of other vehicles), performing computations (as a service) on data provided by a vehicle to supplement the capabilities native to the vehicle, and/or push information to passing or approaching vehicles (e.g., based on sensor data collected at the device 140 or from nearby sensor devices, etc.). A connected vehicle (e.g., 105, 110, 115) may also or instead communicate with cloud-based computing systems (e.g., 150), which may provide similar memory, sensing, and computational resources to enhance those available at the vehicle. For instance, a cloud-based system (e.g., 150) may collect sensor data from a variety of devices in one or more locations and utilize this data to build and/or train machine-learning models which may be used at the cloud-based system (to provide results to various vehicles (e.g., 105, 110, 115) in communication with the cloud-based system 150, or to push to vehicles for use by their in-vehicle systems, among other example implementations. Access points (e.g., 145), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 155) between cloud-based systems (e.g., 150) and various vehicles (e.g., 105, 110, 115). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux™, UNIX™, Microsoft™ Windows™, Apple™ macOS™, Apple™ (OS™, Google™ Android™, Windows Server™, etc., as well as virtual machines adapted to virtualize execution of a particular operating system, including customized and proprietary operating systems.

Any of the flows, methods, processes (or portions thereof) or functionality of any of the various components described below or illustrated in the figures may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

The flows, methods, and processes described below and in the accompanying figures are merely representative of functions that may be performed in particular embodiments. In other embodiments, additional functions may be performed in the flows, methods, and processes. Various embodiments of the present disclosure contemplate any suitable signaling mechanisms for accomplishing the functions described herein. Some of the functions illustrated herein may be repeated, combined, modified, or deleted within the flows, methods, and processes where appropriate. Additionally, functions may be performed in any suitable order within the flows, methods, and processes without departing from the scope of particular embodiments.

Figure 2:
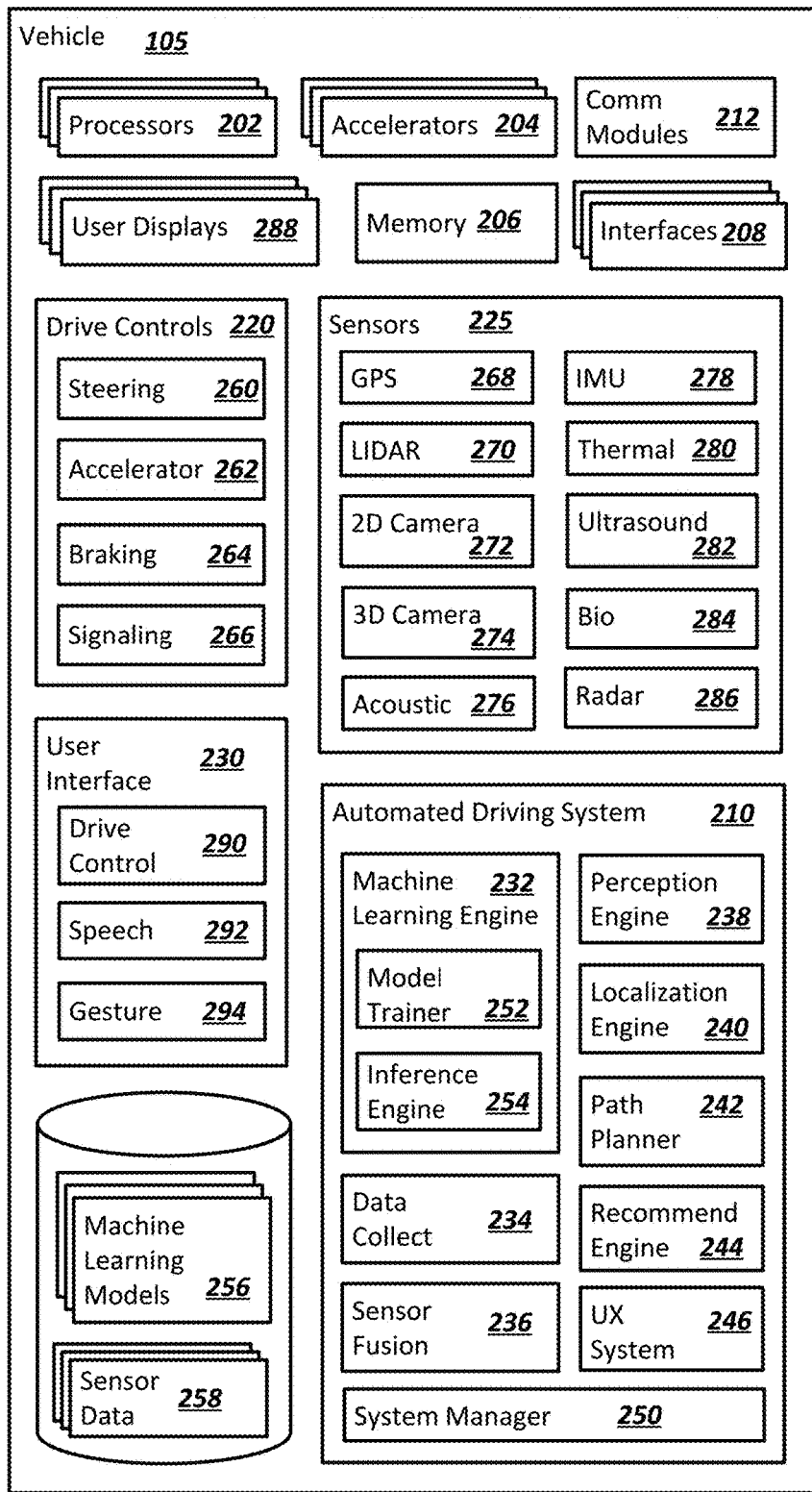
FIG. 2 is a simplified block diagram of an example in-vehicle automated driving system.
Figure 2:
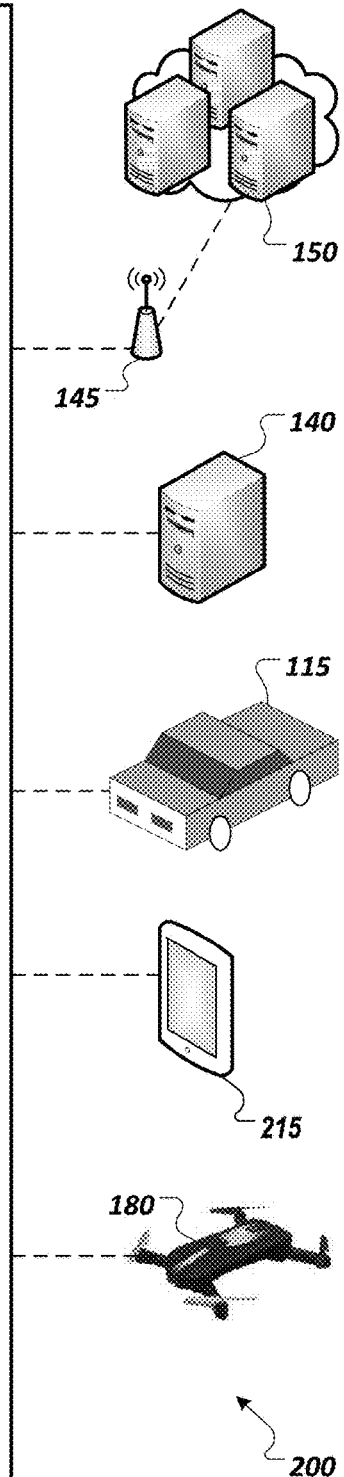

With reference now to FIG. 2, a simplified block diagram 200 is shown illustrating an example implementation of a vehicle (and corresponding in-vehicle computing system) 105 equipped with autonomous driving functionality. In one example, a vehicle 105 may be equipped with one or more processors 202, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 202 may be coupled to or have integrated hardware accelerator devices (e.g., 204), which may be provided with hardware to accelerate certain processing and memory access functions, such as functions relating to machine learning inference or training (including any of the machine learning inference or training described below), processing of particular sensor data (e.g., camera image data, Light Detection and Ranging (LIDAR) sensor point clouds, etc.), performing certain arithmetic functions pertaining to autonomous driving (e.g., matrix arithmetic, convolutional arithmetic, etc.), among other examples. One or more memory elements (e.g., 206) may be provided to store machine-executable instructions implementing all or a portion of any one of the modules or sub-modules of an autonomous driving stack implemented on the vehicle, as well as storing machine learning models (e.g., 256), sensor data (e.g., 258), and other data received, generated, or used in connection with autonomous driving functionality to be performed by the vehicle (or used in connection with the examples and solutions discussed herein). Various communication modules (e.g., 212) may also be provided, implemented in hardware circuitry and/or software to implement communication capabilities used by the vehicle's system to communicate with other extraneous computing systems over one or more network channels employing one or more network communication technologies. These various processors 202, accelerators 204, memory devices 206, and network communication modules 212, may be interconnected on the vehicle system through a variety of interfaces (e.g., 208) implemented, for instance, through one or more interconnect fabrics or links (e.g., 208), such as fabrics utilizing technologies such as a Peripheral Component Interconnect Express (PCIe), Ethernet, Universal Serial Bus (USB), Ultra Path Interconnect (UPI), Controller Area Network (CAN) bus, among others.

Continuing with the example of FIG. 2, an example vehicle (and corresponding in-vehicle computing system) 105 may include an in-vehicle automated driving system 210, driving controls (e.g., 220), sensors (e.g., 225), and user/passenger interface(s) (e.g., 230), among other example modules implemented functionality of the autonomous vehicle in hardware and/or software. For instance, an automated driving system 210, in some implementations, may implement all or a portion of an autonomous driving stack and process flow (e.g., as shown and discussed in the example of FIG. 5). A machine learning engine 232 may be provided to utilize various machine learning models (e.g., 256) provided at the vehicle 105 in connection with one or more autonomous functions and features provided and implemented at or for the vehicle, such as discussed in the examples herein. Such machine learning models 256 may include artificial neural network models, convolutional neural networks, decision tree-based models, support vector machines (SVMs), Bayesian models, deep learning models, and other example models. In some implementations, an example machine learning engine 232 may include one or more model trainer engines 252 to participate in training (e.g., initial training, continuous training, etc.) of one or more of the machine learning models 256. One or more inference engines 254 may also be provided to utilize the trained machine learning models 256 to derive various inferences, predictions, classifications, and other results. In some embodiments, the machine learning model training or inference described herein may be performed off-vehicle, such as by computing system 140 or 150.

The machine learning engine(s) 232 provided at the vehicle may be utilized to support and provide results for use by other logical components and modules of the automated driving system 210 implementing an autonomous driving stack and other autonomous-driving-related features. For instance, a data collection module 234 may be provided with logic to determine sources from which data is to be collected (e.g., for inputs in the training or use of various machine learning models 256 used by the vehicle). For instance, the particular source (e.g., internal sensors (e.g., 225) or extraneous sources (e.g., 115, 140, 150, 180, 215, etc.)) may be selected, as well as the frequency and fidelity at which the data may be sampled is selected. In some cases, such selections and configurations may be made at least partially autonomously by the data collection module 234 using one or more corresponding machine learning models (e.g., to collect data as appropriate given a particular detected scenario).

A sensor fusion module 236 may also be used to govern the use and processing of the various sensor inputs utilized by the machine learning engine 232 and other modules (e.g., 238, 240, 242, 244, 246, etc.) of the in-vehicle processing system. One or more sensor fusion modules (e.g., 236) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 236 may apply direct fusion, indirect fusion, among other example sensor fusion techniques. The output of the sensor fusion may, in some cases by fed as an input (along with potentially additional inputs) to another module of the in-vehicle processing system and/or one or more machine learning models in connection with providing autonomous driving functionality or other functionality, such as described in the example solutions discussed herein.

A perception engine 238 may be provided in some examples, which may take as inputs various sensor data (e.g., 258) including data, in some instances, from extraneous sources and/or sensor fusion module 236 to perform object recognition and/or tracking of detected objects, among other example functions corresponding to autonomous perception of the environment encountered (or to be encountered) by the vehicle 105. Perception engine 238 may perform object recognition from sensor data inputs using deep learning, such as through one or more convolutional neural networks and other machine learning models 256. Object tracking may also be performed to autonomously estimate, from sensor data inputs, whether an object is moving and, if so, along what trajectory. For instance, after a given object is recognized, a perception engine 238 may detect how the given object moves in relation to the vehicle. Such functionality may be used, for instance, to detect objects such as other vehicles, pedestrians, wildlife, cyclists, etc. moving within an environment, which may affect the path of the vehicle on a roadway, among other example uses.

A localization engine 240 may also be included within an automated driving system 210 in some implementation. In some cases, localization engine 240 may be implemented as a sub-component of a perception engine 238. The localization engine 240 may also make use of one or more machine learning models 256 and sensor fusion (e.g., of LIDAR and GPS data, etc.) to determine a high confidence location of the vehicle and the space it occupies within a given physical space (or "environment").

A vehicle 105 may further include a path planner 242, which may make use of the results of various other modules, such as data collection 234, sensor fusion 236, perception engine 238, and localization engine (e.g., 240) among others (e.g., recommendation engine 244) to determine a path plan and/or action plan for the vehicle, which may be used by drive controls (e.g., 220) to control the driving of the vehicle 105 within an environment. For instance, a path planner 242 may utilize these inputs and one or more machine learning models to determine probabilities of various events within a driving environment to determine effective real-time plans to act within the environment.

In some implementations, the vehicle 105 may include one or more recommendation engines 244 to generate various recommendations from sensor data generated by the vehicle's 105 own sensors (e.g., 225) as well as sensor data from extraneous sensors (e.g., on sensor devices 115, 180, 215, etc.). Some recommendations may be determined by the recommendation engine 244, which may be provided as inputs to other components of the vehicle's autonomous driving stack to influence determinations that are made by these components. For instance, a recommendation may be determined, which, when considered by a path planner 242, causes the path planner 242 to deviate from decisions or plans it would ordinarily otherwise determine, but for the recommendation. Recommendations may also be generated by recommendation engines (e.g., 244) based on considerations of passenger comfort and experience. In some cases, interior features within the vehicle may be manipulated predictively and autonomously based on these recommendations (which are determined from sensor data (e.g., 258) captured by the vehicle's sensors and/or extraneous sensors, etc.

As introduced above, some vehicle implementations may include user/passenger experience engines (e.g., 246), which may utilize sensor data and outputs of other modules within the vehicle's autonomous driving stack to cause driving maneuvers and changes to the vehicle's cabin environment to enhance the experience of passengers within the vehicle based on the observations captured by the sensor data (e.g., 258). In some instances, aspects of user interfaces (e.g., 230) provided on the vehicle to enable users to interact with the vehicle and its autonomous driving system may be enhanced. In some cases, informational presentations may be generated and provided through user displays (e.g., audio, visual, and/or tactile presentations) to help affect and improve passenger experiences within a vehicle (e.g., 105) among other example uses.

In some cases, a system manager 250 may also be provided, which monitors information collected by various sensors on the vehicle to detect issues relating to the performance of a vehicle's autonomous driving system. For instance, computational errors, sensor outages and issues, availability and quality of communication channels (e.g., provided through communication modules 212), vehicle system checks (e.g., issues relating to the motor, transmission, battery, cooling system, electrical system, tires, etc.), or other operational events may be detected by the system manager 250. Such issues may be identified in system report data generated by the system manager 250, which may be utilized, in some cases as inputs to machine learning models 256 and related autonomous driving modules (e.g., 232, 234, 236, 238, 240, 242, 244, 246, etc.) to enable vehicle system health and issues to also be considered along with other information collected in sensor data 258 in the autonomous driving functionality of the vehicle 105. In some implementations, safety manager 250 may implement or embody an example safety companion subsystem, among other example features.

In some implementations, an autonomous driving stack of a vehicle 105 may be coupled with drive controls 220 to affect how the vehicle is driven, including steering controls (e.g., 260), accelerator/throttle controls (e.g., 262), braking controls (e.g., 264), signaling controls (e.g., 266), among other examples. In some cases, a vehicle may also be controlled wholly or partially based on user inputs. For instance, user interfaces (e.g., 230), may include driving controls (e.g., a physical or virtual steering wheel, accelerator, brakes, clutch, etc.) to allow a human driver to take control from the autonomous driving system (e.g., in a handover or following a driver assist action). Other sensors may be utilized to accept user/passenger inputs, such as speech detection 292, gesture detection cameras 294, and other examples. User interfaces (e.g., 230) may capture the desires and intentions of the passenger-users and the autonomous driving stack of the vehicle 105 may consider these as additional inputs in controlling the driving of the vehicle (e.g., drive controls 220). In some implementations, drive controls may be governed by external computing systems, such as in cases where a passenger utilizes an external device (e.g., a smartphone or tablet) to provide driving direction or control, or in cases of a remote valet service, where an external driver or system takes over control of the vehicle (e.g., based on an emergency event), among other example implementations.

As discussed above, the autonomous driving stack of a vehicle may utilize a variety of sensor data (e.g., 258) generated by various sensors provided on and external to the vehicle. As an example, a vehicle 105 may possess an array of sensors 225 to collect various information relating to the exterior of the vehicle and the surrounding environment, vehicle system status, conditions within the vehicle, and other information usable by the modules of the vehicle's automated driving system 210. For instance, such sensors 225 may include global positioning (GPS) sensors 268, light detection and ranging (LIDAR) sensors 270, two-dimensional (2D) cameras 272, three-dimensional (3D) or stereo cameras 274, acoustic sensors 276, inertial measurement unit (IMU) sensors 278, thermal sensors 280, ultrasound sensors 282, bio sensors 284 (e.g., facial recognition, voice recognition, heart rate sensors, body temperature sensors, emotion detection sensors, etc.), radar sensors 286, weather sensors (not shown), among other example sensors. Sensor data 258 may also (or instead) be generated by sensors that are not integrally coupled to the vehicle, including sensors on other vehicles (e.g., 115) (which may be communicated to the vehicle 105 through vehicle-to-vehicle communications or other techniques), sensors on ground-based or aerial drones 180, sensors of user devices 215 (e.g., a smartphone or wearable) carried by human users inside or outside the vehicle 105, and sensors mounted or provided with other roadside elements, such as a roadside unit (e.g., 140), road sign, traffic light, streetlight, etc. Sensor data from such extraneous sensor devices may be provided directly from the sensor devices to the vehicle or may be provided through data aggregation devices or as results generated based on these sensors by other computing systems (e.g., 140, 150), among other example implementations.

In some implementations, an autonomous vehicle system 105 may interface with and leverage information and services provided by other computing systems to enhance, enable, or otherwise support the autonomous driving functionality of the device 105. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices (e.g., 140), other (e.g., higher-level) vehicles (e.g., 115), and cloud-based systems 150 (e.g., accessible through various network access points (e.g., 145)). A roadside unit 140 or cloud-based system 150 (or other cooperating system, with which a vehicle (e.g., 105) interacts may include all or a portion of the logic illustrated as belonging to an example in-vehicle automated driving system (e.g., 210), along with potentially additional functionality and logic. For instance, a cloud-based computing system, road side unit 140, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's automated driving system 210. For instance, an automated driving system 210 may rely on the machine learning training, machine learning inference, and/or machine learning models provided through a cloud-based service for certain tasks and handling certain scenarios. Indeed, it should be appreciated that one or more of the modules discussed and illustrated as belonging to vehicle 105 may, in some implementations, be alternatively or redundantly provided within a cloud-based, fog-based, or other computing system supporting an autonomous driving environment.

Figure 3:
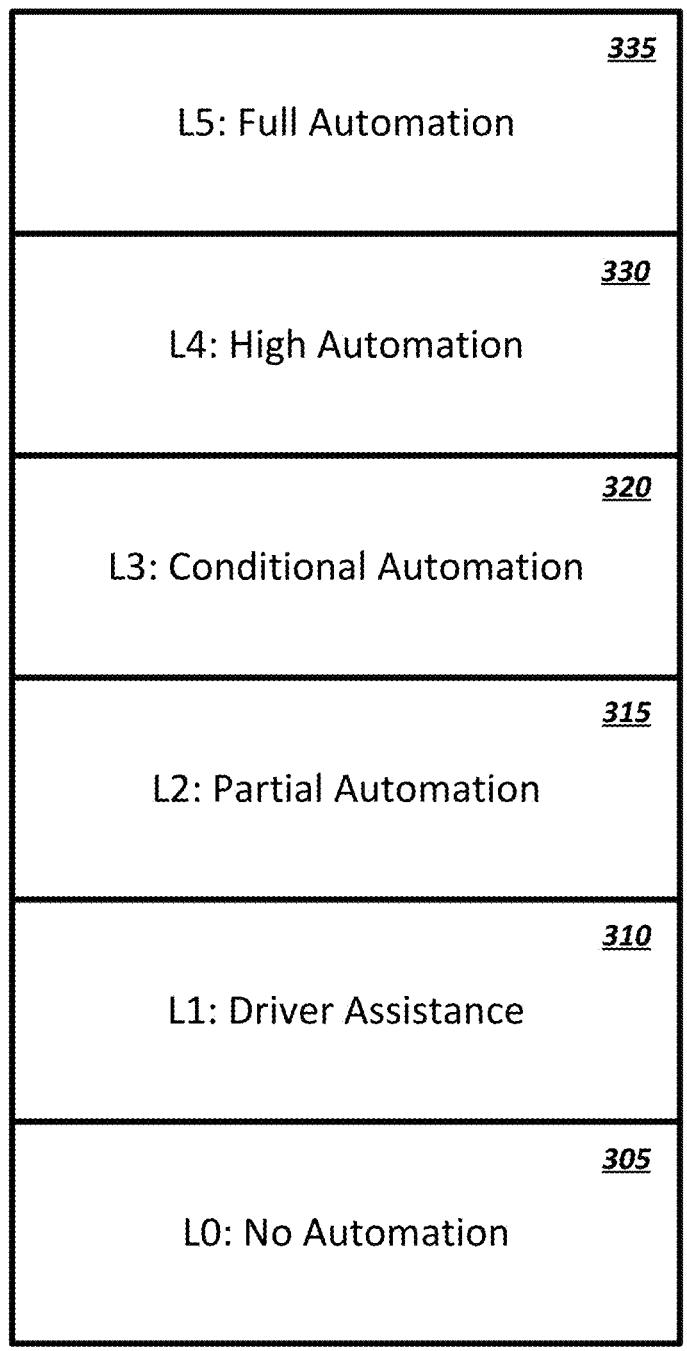
FIG. 3 is a simplified block diagram illustrating automated driving levels.

Turning to FIG. 3, a simplified block diagram 300 is shown illustrating example levels of autonomous driving, which may be supported in various vehicles (e.g., by their corresponding in-vehicle computing systems. For instance, a range of levels may be defined (e.g., L0-L5 (405-435)), with level 5 (L5) corresponding to vehicles with the highest level of autonomous driving functionality (e.g., full automation), and level 0 (L0) corresponding the lowest level of autonomous driving functionality (e.g., no automation). For instance, an L5 vehicle (e.g., 335) may possess a fully-autonomous computing system capable of providing autonomous driving performance in every driving scenario equal to or better than would be provided by a human driver, including in extreme road conditions and weather. An L4 vehicle (e.g., 330) may also be considered fully-autonomous and capable of autonomously performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 320) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 315) provide driver assistance functionality, which allow the driver to occasionally disengage from physically operating the vehicle, such that both the hands and feet of the driver may disengage periodically from the physical controls of the vehicle. L1 vehicles (e.g., 310) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 4:
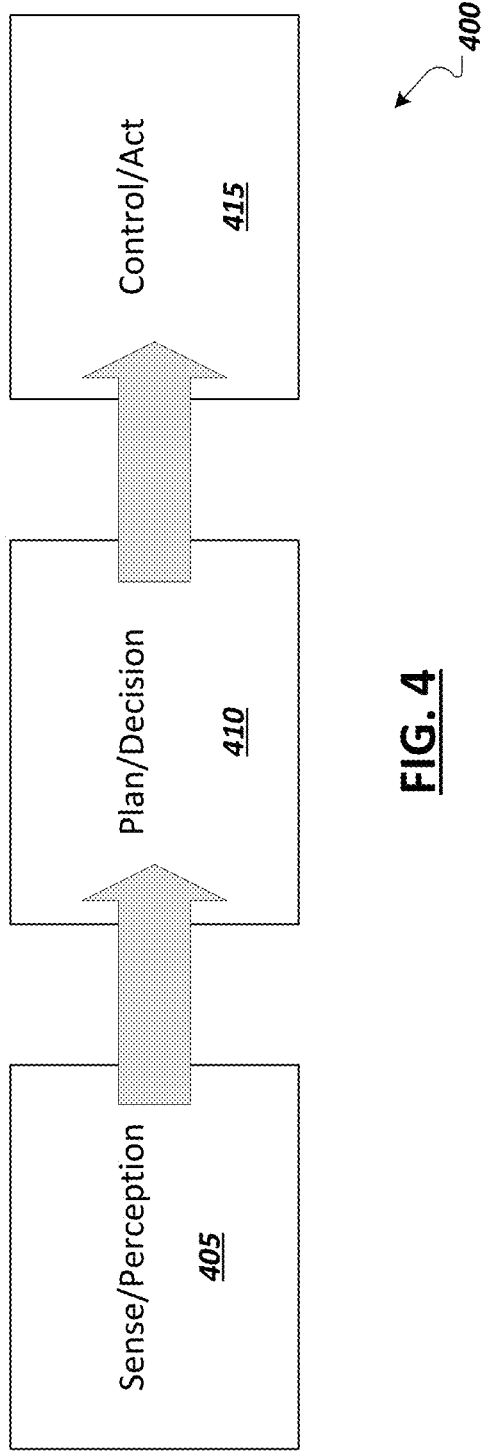
FIG. 4 is a simplified block diagram illustrating operating principles of an automated driving system.
Figure 5:
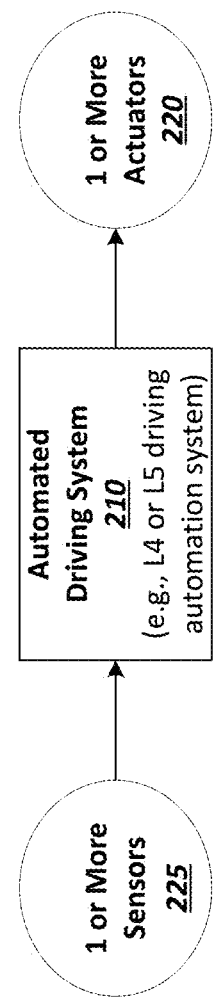
FIG. 5 is a simplified block diagram illustrating basic functions of automated driving systems.

FIG. 4 is a simplified block diagram 400 illustrating an example autonomous driving flow which may be implemented in some autonomous driving systems. For instance, an autonomous driving flow implemented in an autonomous (or semi-autonomous) vehicle may include a sensing and perception stage 405, a planning and decision stage 410, and a control and action phase 415. During a sensing and perception stage 405 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 410 may utilize the sensor data and results of various perception operations to make probabilistic predictions of the roadway(s) ahead and determine a real time path plan based on these predictions. A planning and decision stage 410 may additionally include making decisions relating to the path plan in reaction to the detection of obstacles and other events to decide on whether and what action to take to safely navigate the determined path in light of these events. Based on the path plan and decisions of the planning and decision stage 410, a control and action stage 415 may convert these determinations into actions, through actuators to manipulate driving controls including steering, acceleration, and braking, as well as secondary controls, such as turn signals, sensor cleaners, windshield wipers, headlights, etc. Accordingly, as illustrated in FIG. 5, the general function of an automated driving system 210 may utilize the inputs of a one or more sensors devices 225 (e.g., multiple sensors of multiple different types) and process these inputs to make a determination for the automated driving of a vehicle. To realize the performance of the automated driving (e.g., acceleration, steering, braking, signaling, etc.), the automated driving system 210 may generate one or more output signals to implement the determining automated driving actions and send these signals to one or more driving controls, or more generally "actuators" 220, utilized to cause the corresponding vehicle to perform these driving actions.

Figure 6:
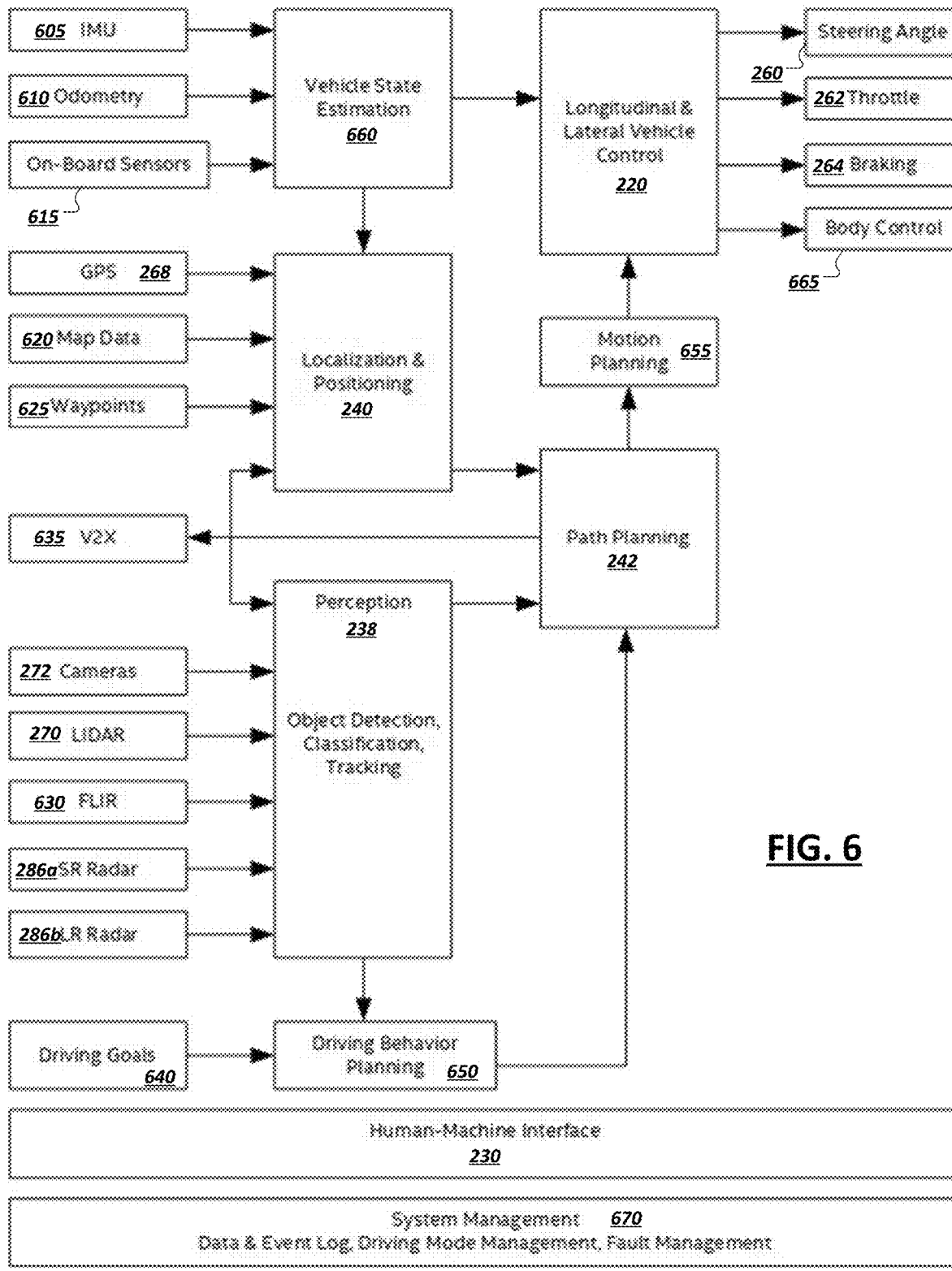
FIG. 6 is a simplified block diagram illustrating components of an example automated driving system.

FIG. 6 is a simplified block diagram illustrating the example interaction of components and logic used to implement an in-vehicle automated driving system in accordance with one example implementation. For instance, a variety of sensors and logic may be provided which may generate data that may be used by the automated driving system, such as inertial measurement units (IMUS) 605, odometry logic 610, on-board sensors 615, GPS sensors 268, map data 620, waypoint data and logic (e.g., 625), cameras (e.g., 272), LIDAR sensors 270, short range radar sensors 286*a*, long range radar sensors 286*b*, forward-looking infrared (FLIR) sensor 630, among other example sensors. Additional information may be provided from sources external to the vehicle (e.g., through a network facilitating vehicle-to-everything (V2X) communications (e.g., 635)) or from the user of the vehicle (e.g., driving goals (e.g., 640) or other inputs provided by passengers within the vehicle (e.g., through human-machine interfaces (e.g., 230)). Some of these inputs may be provided to a perception engine 238, which may assess the information included in sensor data generated by one or a combination of the vehicle's sensors (or even external (e.g., roadside) sensors) and perform object detection (e.g., to identify potential hazards and road characteristics), classify the objects (e.g., to determine whether they are hazards or not), and track objects (e.g., to determine and predict movement of the objects and ascertain whether or when the objects should impact the driving of the vehicle).

Other sensors and logic (e.g., 268, 620, 625, etc.) may be fed to localization and positioning logic (e.g., 240) of the automated driving system to enable accurate and precise localization of the vehicle by the automated driving system (e.g., to understand the geolocation of the vehicle, as well as its position relative to certain actual or anticipated hazards, etc.). Results of the perception engine 230 and localization engine 240 may be utilized together by path planning logic 242 of the automated driving system, such that the vehicle self-navigates toward a desired outcome, while more immediately doing so in a safe manner. Driving behavior planning logic (e.g., 650) may also be provided in some implementations to consider driving goals (e.g., system-level or user-customized goals) to deliver certain driving or user comfort expectations (e.g., speed, comfort, traffic avoidance, toll road avoidance, prioritization of scenic routes or routes that keep the vehicle within proximity of certain landmarks or amenities, etc.). The output of the driving behavior planning module 650 may also be fed into and be considered by a path planning engine 242 in determining the most desirable path for the vehicle.

A path planning engine 242 may decide on the path to be taken by a vehicle, with a motion planning engine 655 tasked with determining "how" to realize this path (e.g., through the driving control logic (e.g., 220) of the vehicle. The driving control logic 220 may also consider the present state of the vehicle as determined using a vehicle state estimation engine 660. The vehicle state estimation engine 660 may determine the present state of the vehicle (e.g., in which direction(s) it is currently moving, the speed is traveling, whether it is accelerating or decelerating (e.g., braking), etc.), which may be considered in determining what driving functions of the vehicle to actuate and how to do so (e.g., using driving control logic 220). For instance, some of the sensors (e.g., 605, 610, 615, etc.) may be provided as inputs to the vehicle state estimation engine 660 and state information may be generated and provided to the driving control logic 220, which may be considered, together with motion planning data (e.g., from motion planning engine 655) to direct the various actuators of the vehicle to implement the desired path of travel accurately, safely, and comfortably (e.g., by engaging steering controls (e.g., 260), throttle (e.g., 262), braking (e.g., 264), vehicle body controls (e.g., 665), etc.), among other examples.

To assess the performance of the automated driving system and its collective components, in some implementations, one or more system management tools (e.g., 670) may also be provided. For instance, system management tools 670 may include logic to detect and log events and various data collected and/or generated by the automated driving system, for instance, to detect trends, enhance or train machine learning models used by the automated driving system, and identify and remedy potential safety issues or errors, among other examples. Indeed, in some implementations, system management tools 670 may include safety sub-systems or companion tools (e.g., as discussed in more detail herein), and may further include fault detection and remediation tools, among other example tools and related functionality.

As should be appreciated, the automation of vehicles, when incorrectly or inadequately implemented, has the potential to cause catastrophic injury and harm to not only the passengers of the automated vehicle, but also passengers of other vehicles sharing the road, pedestrians and cyclists, buildings, public infrastructure, etc. Accordingly, safety mechanisms and sub-systems may be employed within a vehicle to assist in ensuring that the vehicle operates correctly. Indeed, minimum safety standards may be defined for certain elements of the automated driving system 210 of a vehicle and related sensors, actuators, and subsystems, both individually and collectively (e.g., an aggregate safety rating for the combination of elements implementing the vehicle's automated driving functionality. For instance, the International Organization for Standardization (ISO) has defined ISO 26262, titled "Road vehicles—Functional safety," which defines minimums standards as well as a risk classification scheme for vehicle safety, such as the Automotive Safety Integrity Level (ASIL). In some cases, in order for an automated driving system and autonomous vehicle to be considered sufficiently safe to be allowed on roadways, or for components or subsystems of the vehicle to be considered safe enough to be implemented in such vehicles, the systems and components must satisfy certain safety standards and regulations (e.g., according to ASIL standards), among other examples.

In order to implement an autonomous vehicle with systems that satisfy ASIL or other safety requirements, some implementations may include run-time failure mitigation capabilities that are required for the automated driving system into each hardware component utilized within the vehicle. This may entail adding the mechanisms required during system operation for detecting, controlling, reporting, and possibly recovering from failures into each hardware component in an automated driving system. In other implementations, the hardware and associated software utilized to perform vehicle automation may be deliberately replicated into multiple modules, achieving safety through redundancy (e.g., dual, triple, or N-modular redundancy). Additionally, such components, while redundant, may nonetheless be implemented using diverse architectures (e.g., multiple components of the same type but with different architectures or implementations) in order to realize a degree of diversity in implementation to enable detection of systematic hardware failures (e.g., silicon bugs). In such cases, failures may be detected, controlled, and reported by comparing intermediate and final results across the N modules, among other example implementations.

However, as illustrated above, automated driving systems are complex in nature, having many hardware components (e.g., CPU, memory, storage, accelerators, networking, etc.). Driving all run-time failure mitigation capabilities into each hardware component can be cost-prohibitive, both in terms of research and development (R&D) and product cost. Additionally, fault mitigation capabilities may be in direct competition with the resources required (R&D, die area, etc.) for other features and performance and may result in burdening hardware components based on the specific requirements of only one of the markets in which the hardware component is employed. Additionally, implementations relying on modular redundancy may be unduly expensive and complex for a system. For instance, requiring replication of complete hardware and software results in corresponding multiplication in added costs, power, and space, making such systems potentially unaffordable and commercially impractical.

In some implementations, an improved safety platform may be implemented in connection with an automated driving system of an autonomous vehicle that remedies at least some of the example issues identified above. For instance, a system is provided, which implements cost-effective, modular, independent safety monitoring of run-time failures in an automated driving compute system performing safety-critical automated driving tasks. An improved safety system implementation may provide an architecture and cooperative structure across two discrete, distributed systems for independent software-based safety monitoring of AD applications. The safety monitoring software component of the architecture may independently monitor the compute hardware involved in the automated driving system (e.g., the compute hardware utilized to execute the automated driving system logic as well as the compute hardware utilized to execute the safety management or companion logic) and the automated driving system application(s) (e.g., software, firmware, etc.). Further the safety monitoring software component may capture and process safety-related events, and ensures independence between the two subsystems.

Such an architecture may enable a decomposition of safety standards and features implemented on the two subsystems (e.g., with the subsystems having different ASIL ratings). For instance, a lower ASIL allocation may be implemented on the more complex automated driving compute subsystem, with a comparatively higher (e.g., highest) ASIL allocation being implemented on the relatively simpler (from a logic and compute standpoint) safety companion subsystem. Such an architecture may additionally enable customers to decouple the development timeline of their automate driving systems and applications from the development of hardware and software for safety monitoring. Indeed, the former can be optimized based on the application- or vehicle-specific use cases to be supported, while the latter can be optimized based on the required failure monitoring and reporting, all while enabling a system which, in the aggregate, is in compliance with minimum safety standard thresholds (e.g., aggregate ASIL rating). Such an architecture may enable faster automated driving system development and more cost-effective R&D for system hardware and software, among other example benefits and advantages.

Figure 7:
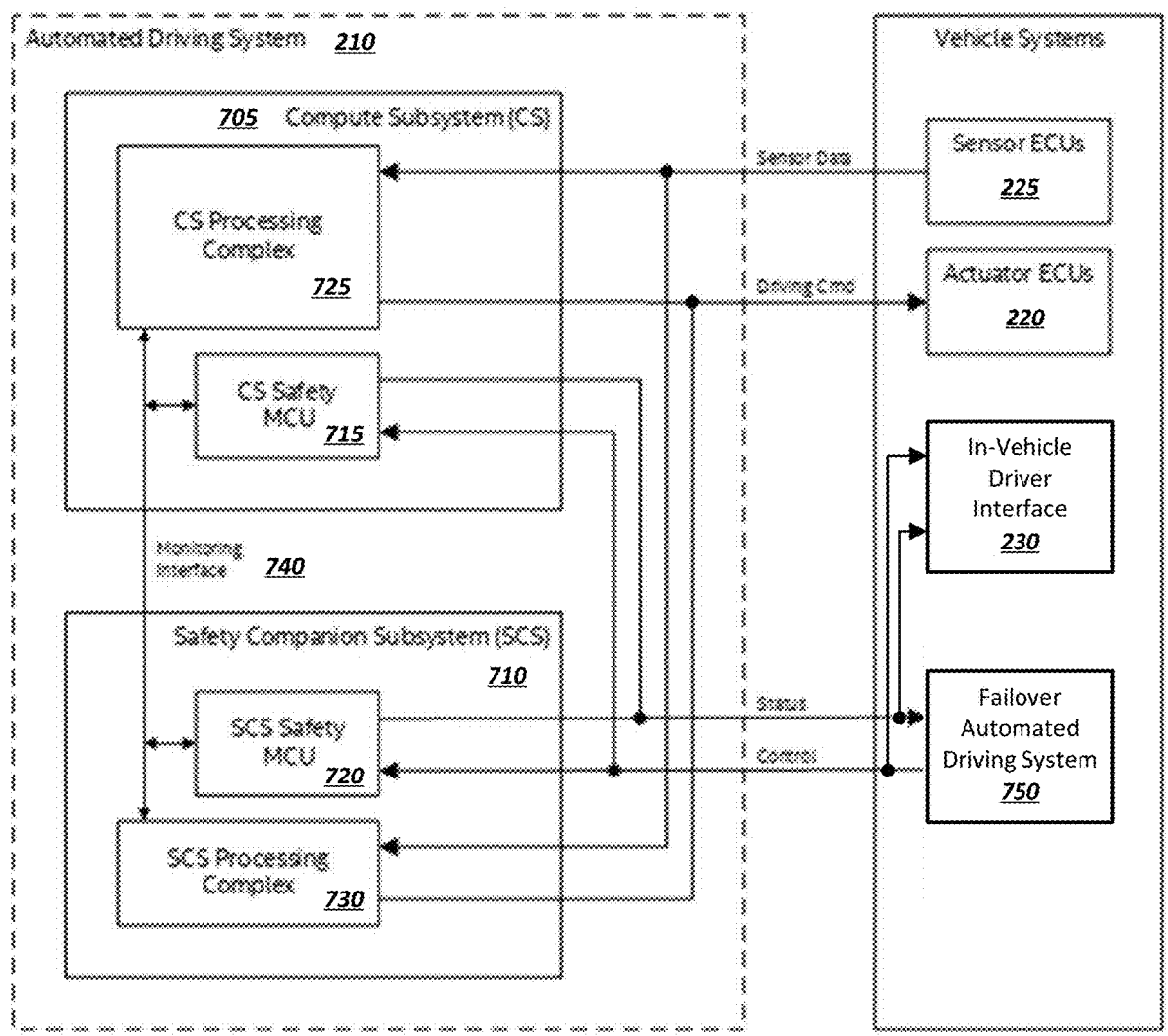
FIG. 7 is a simplified block diagram of an example automated driving system including a safety companion subsystem.

FIG. 7 is a simplified block diagram 700 showing an example automated driving system architecture 210, which includes a bifurcated automated driving compute subsystem 705 and an independent safety companion subsystem 710. Each of the compute subsystem 705 and safety companion subsystem 710 includes a separate, respective microcontroller unit (MCU) (e.g., 715, 720) and computer-implemented logic (e.g., 725, 730) configured to be efficiently executed by the subsystem's respective MCU (e.g., 715, 720). As a combined system 210, the automated driving system 710 performs driving tasks that would otherwise be performed by a human driver. For instance, the automated driving system may include functionality for monitoring the driving environment (e.g., detecting, classifying, and recognizing static and dynamic roadway objects), deciding vehicle response, planning lateral (steering) and longitudinal (acceleration and deceleration) vehicle motion, and commanding vehicle motion, among other potential functions. Generally, implementation of the dynamic driving tasks by the automated driving system consists of receiving sensor input, computing a safe vehicle driving response based on the sensor input, and transmitting the determined driving commands to actuators (see also FIG. 5). As discussed above, the overall system (e.g., 210) responsible for performing the computation for driving response may be required to do so in a functionally safe manner and meet strict standardized requirements (e.g., ASIL standards). However, the computations performed by the system 210 may be affected by random hardware faults (e.g., soft and hard malfunctions in hardware) and systematic failures (e.g., hardware and software bugs/malfunctions). Both these two types of malfunctions can lead to hazardous events that may cause harm to people, such as side, frontal, or rear collisions with other vehicles, pedestrian and cyclist accidents, impacts with static roadside objects (e.g., guardrails, curbs, fences, utility poles, vegetation), among other example hazards.

In one example implementation, compute subsystem 705 may be configured to perform automated driving tasks, while the safety companion subsystem 710 is tasked with monitoring and potentially correcting or at least mitigating malfunctions of the compute subsystem 705 detected by the safety companion subsystem 710. By providing an architecture and cooperative structure across two distributed systems for independent software-based safety monitoring of the automated driving system's automated driving function, redundancy and system diversity may be leveraged to realize the requisite safety standards, while providing a modularized approach, which may enable increased ease in research and development and bifurcated development and improvements to the subsystems. For instance, an aggregate safety standard metric required for the implementation of the entire automated driving system 210, such as a threshold ASIL rating, may be decomposed across the compute subsystem 705 and the safety companion subsystem 710. Accordingly, functionality and features of the safety companion subsystem 710 may be enhanced relative to those of the compute subsystem 710. As examples, the safety companion subsystem 710 may be provided with enhanced safety assurance capabilities such as periodic self-testing of cores, on-chip memories (cache and register files including both arrays and logic), on-chip memory controller logic, on-chip PCIe controller logic, on-chip memory coherency logic, etc. As additional example, the safety companion subsystem 710 may be configured to perform runtime monitoring of on-chip integrated voltage regulators and on-chip clocks and phase-locked loop (PLL) circuitry, and other self-monitoring, among other example features. Accordingly, the relatively enhanced features of the safety companion subsystem 710 (vis-à-vis the compute subsystem 705) may achieve an ASIL decomposition that allows the allocation of different ASIL ratings for the safety requirements allocated to each of the compute subsystem 705 and the safety companion subsystem 710. In particular, ASIL decomposition allows the safety requirements satisfied by the compute subsystem 705 (the intended functionality of automated driving) to have a lower ASIL than the safety requirements satisfied by the safety companion subsystem 710 (which provides the safety mechanisms for automated driving). For example, the compute subsystem 705 can provide ASIL QM capability while the safety companion subsystem 710 provides ASIL D capability, among other implementations and specific ASIL combinations/contributions. Through such an imbalanced ASIL decomposition between the compute subsystem 705 and the safety companion subsystem 710, the overall ASIL requirements may nonetheless be satisfied, while allowing the safety engineering investment to be focused on the safety companion subsystem 710, which may be advantageous given the more complex functionality and logic of the compute subsystem 705 (relative to the safety companion subsystem 710). Indeed, the total research and development utilized to implement such an architecture may be lower than if the compute subsystem 705 alone implemented all the safety functionality, among other example advantages.

Continuing with the example of FIG. 7, an example safety companion subsystem 710 may access data generated at the compute subsystem 705 over a monitoring interface 740 to determine whether the compute subsystem 705 is operating correctly to implement safe automated driving functionality. The safety companion subsystem 710 may monitor both the software-implemented applications (e.g., implemented in the compute subsystem's 705 processing complex 725), such as software implementing object detection, object tracking, path planning, localization and positioning, vehicle state estimation, and signaling to driving control actuators, among other features and functions. The safety companion subsystem 710 may also monitor the operation of the compute subsystem's hardware, including the microcontroller(s) (e.g., 715) of the system hardware, hardware accelerators, and other hardware implemented logic and processors used to execute the software of the compute subsystem processing complex 725. Still further, in some implementations, the safety companion subsystem 710 may include logic to monitor the correct function of its own hardware (e.g., safety companion subsystem MCU 720) to determine whether the safety functionality provided by the safety companion 710 is operating correctly and can be trusted to secure safety of the automated driving system.

For instance, as illustrated in FIG. 7, data may be collected by the safety companion subsystem 710 from the compute subsystem 705 that identifies operation of both the compute subsystem's software (e.g., 725) and hardware (e.g., 715). For example, decisions and determinations made by the compute subsystem processing complex 725 applications, such as object determinations, object classifications, path plans, determined commands to be sent to the vehicle actuators (e.g., 220) and other information may be included in data collected from monitoring of the compute subsystem processing complex 725. This information may be processed using the safety companion's application (e.g., at 730) to determine, from the information collected from the compute subsystem's processing complex 725, what determinations have been made by the compute subsystem 705 and, based on these determinations, what actions should be triggered by the compute subsystem 705 to implement safe and appropriate driving actions. The safety companion 710 may determine the correct response of the compute subsystem 705 and monitor the compute subsystem 705 to ensure that this correct response is taken (e.g., brake or steer away from a hazardous object detected through the sensors 225 of the system). If the compute subsystem 705 does not operate in the predicted safe manner, the safety companion 710 can, if necessary, override the actions instructed by the compute subsystem (e.g., instruct brake actuators to brake and cut off a signal to a throttle actuator from the compute subsystem to instead accelerate based on the detection of a hazard) and may log the detected error of the compute subsystem. In some cases, the safety companion 710 (e.g., in response to detecting a fatal error or multiple or repeated errors by the compute subsystem's processing complex over a time period) may engage a failover automated driving system (e.g., 750) and/or present information to passengers of the vehicle using an in-vehicle user interface (e.g., 230), for instance, to reengage a human driver to take over manual control of the vehicle (e.g., in response to functionality of the automated driving system being at least temporarily disabled by the safety companion based on incorrect actions by the compute subsystem 705 detected by the safety companion 710 (e.g., to reduce the automation level of the vehicle's automated driving system (e.g., from L4 to L2 or L1), among other examples.

In addition to monitoring the data and signals generated by the compute subsystem software (at 725), the monitoring interface 740 may enable the safety companion to intercept signals generated within the hardware 715 of the compute subsystem 705 to allow the safety companion 710 (e.g., through a corresponding module or application within the safety companion processing complex 730) to detect faults and errors at the hardware level and determine whether the hardware (e.g., 715) of the compute subsystem is operating reliably to be trusted to deliver accurate and safe results (e.g., in its execution of automated driving applications provided in the compute subsystem processing complex software 725). For instance, signals generated at the compute system MCU 715 may be intercepted and sent to the safety companion processing complex 730 to detect the occurrence of soft errors or other errors which may critically impact the correct operation of the compute subsystem 705. Determining such issues may also cause the safety companion subsystem 710 to interrupt normal functioning of the automated driving system 210, such as discussed above, by causing the safety companion subsystem to (e.g., using its more basic automated driving logic) take control of the direction of the vehicle actuators 220; invoke failover driving system functionality (e.g., at 750); present warnings, alerts, or other messages through in-vehicle user interfaces (e.g., 230); among other examples. Similarly, errors detected by the safety companion in its own hardware (e.g., 730) may cause the safety companion subsystem 710 to direct alternative functioning of the vehicle (e.g., return the vehicle to manual driver control, invocation of failover driving systems, invocation of remote driver assistance/control, among other actions) to secure safety of the vehicle and its passengers.

Figure 8:
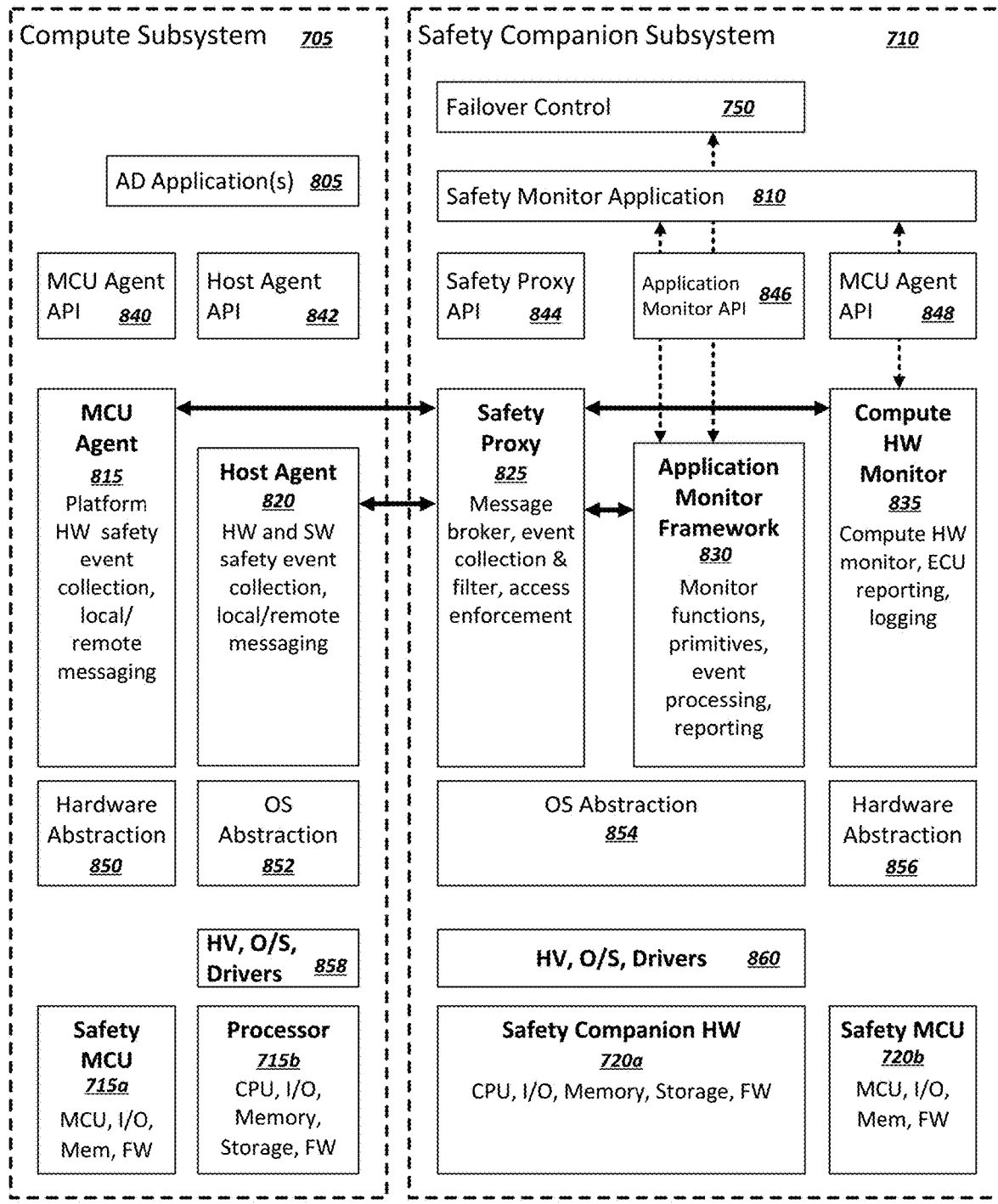
FIG. 8 is a simplified block diagram illustrating an example safety companion subsystem cooperating with a compute subsystem of an automated driving system.

Turning to FIG. 8, a simplified block diagram 800 is shown illustrating example stack implementations of an example compute subsystem 705 and safety companion subsystem 710. As introduced above, the compute subsystem 705 may include automated driving application(s) 805 to implement the processing of sensor data to determine automated driving actions for a vehicle. Additionally, a safety monitor application 810 may be provided on the safety companion subsystem 710 to implement logic (e.g., executable by safety companion processing hardware (e.g., 720a, 720b)) to monitor the proper functioning of the compute subsystem, its software and hardware, monitor the performance of the safety companion hardware, and even, in some implementations, execute simplified automated driving operations (and/or invoke internal failover control logic (e.g., 750) or a more robust failover automated driving system provided on the vehicle) in an attempt to remedy or mitigate effects of errors or other issues determined to affect the safety of the automated driving decisions driven by the compute subsystem 705.

In some implementations, to assist in facilitating monitoring of the compute subsystem 705, agents (e.g., 815, 820) may be provided (e.g., installed as a separate component and/or alternatively integrated with the corresponding compute subsystem components) to intercept data containing information of interest to the safety companion subsystem 705 and pass this information (e.g., in approximately real time, upon its generation at the compute subsystem) to the safety companion subsystem 710. In the particular example of FIG. 8, the compute subsystem 705 may include a microcontroller (MCU) agent 815 (among potentially other hardware agents for other hardware (e.g., accelerators) used by the compute subsystem 705 to execute automated driving logic) to enable data to be collected at the hardware level (e.g., describing local signaling within the hardware, remote messaging describing inputs and outputs of the hardware, etc.), which the safety companion 710 may use to detect errors, bugs, and other issues affecting the compute subsystem hardware (e.g., 715a, 715b). The hardware agent (e.g., 815) may include intelligence to identify those signals that have the potential of affecting safety of the platform and may filter out other signals of lesser relevance from reporting to the safety companion.

In the example of FIG. 8, the software of the compute subsystem 705 may also be outfitted with an agent (e.g., host agent 820) to similarly monitor the various software components and transactions of the compute subsystem 705. For instance, sensor data input to the compute subsystem, determinations by the various compute subsystem components identifying decisions and determinations of the compute subsystem (e.g., object recognition results, path planning results, localization results, vehicle state results), and other data may be captured by the host agent(s) 820 and shared with the safety companion 710. This information may allow the safety companion to not only identify the outputs of the compute subsystem 705 to various vehicle actuators (e.g., to drive certain automated driving actions), but also to detect the intermediate determinations, which the automated driving application(s) 805 may utilize to determine these actions, to allow errors to be detected and logged (and potentially acted upon) by the safety companion, in some cases before corresponding incorrect and possibly unsafe actions are taken by the compute subsystem 705. An application programming interface (API) layer (e.g., implemented through APIs 840, 842) may be provided to facilitate interaction between the agents (e.g., 815, 820) and the monitored components (e.g., hardware 715a,b and software (e.g., 805)) of the compute subsystem 705, among other example implementations.

Continuing with the example of FIG. 8, in some implementations, the safety companion 710 may include a safety proxy 825 to serve as an inbox, receptacle, or clearing house for data collected or generated by other monitoring components (e.g., compute subsystem agents (e.g., 815, 820), safety companion hardware monitors (e.g., 835), etc.). The safety proxy 825 may include logic to broker messages from these components, collect and potentially filter the received data, and control access to the data (e.g., by the application monitor framework, hardware monitor 835, safety monitor application 810, etc.). For instance, the safety proxy 825 may serve as the message broker between the safety monitor application 810 and the agents (e.g., 815, 820) on the compute subsystem (e.g., 705). Additionally, a safety proxy 825 may track/queue reported safety-related events and state until consumed by the safety monitor application 810. The safety monitor application 810 consumes the events and state provided by the safety proxy 825 (e.g., with assistance from application monitor framework 830 and/or associated APIs (e.g., 846) to perform independent monitoring of the automated driving application 805. Additionally, a safety proxy 825 may enforce safe communication between the safety companion subsystem 810 and the compute subsystem 805. Indeed, the safety proxy 825 may parse the received data to enforce various policies, such as policies to isolate "bad" data received from the compute subsystem to ensure this data is not relied upon or consumed by the safety companion 710, policies to prioritize data describing safety-related events based on criticality or temporal restraints, based on the source of the data (e.g., with data creator roles being assigned to some monitoring components (e.g., 815, 820, 935, etc.), among other examples.

By way of example, the processing complex of an example compute subsystem 705 may contain the automated driving applications (e.g., 805) used to processes sensor information and generate driving commands. The automated driving application(s) 805 on the compute subsystem 705 may utilize a corresponding API (e.g., 842) to provide safety-related state and events to the host agent 820 executing on the compute subsystem's processing complex. The state and events can include safety-related information such as static and dynamic roadway objects detected, path planning decisions, and driving commands. The host agent 820 may report their information to the safety proxy 825 executing on the safety companion subsystem 710.

An application monitor framework 830 may be provided in some implementations to assist in quickly delivering or routing the needed data collected at the safety proxy to the safety monitor application 810 (and, in cases where safety companion failover control (e.g., 750) is invoked, to the failover control). For instance, the application monitor framework 830 may implemented to include a set of re-usable monitoring primitives that are optimized for the security companion subsystem hardware (e.g., 720a, 720b). These primitives may include function for tracking safety-related application state, configuration state, safety-related event processing, logging and reporting, among other example features. As the safety companion hardware monitor 835 is present on the safety companion subsystem 710, in some cases, it may interface directly with the safety monitoring application 810, providing data to the safety monitoring application 810 directly, rather than delivering the safety proxy 825 to be aggregated with other information (including information generated outside the safety companion subsystem 710) to be routed by the application monitor framework 830, among other example alternatives and implementations. The safety companion hardware monitor 835 can monitor operation of the safety companion hardware (e.g., 720a,b) to ensure the hardware is operating correctly to yield reliable results by the safety monitor application 810. In some implementations, the safety companion hardware monitor 835 may also be used to process data generated at the compute subsystem describing hardware of the compute subsystem and detect errors and events from this data. In other implementations, events and errors may be additionally or alternatively detected by hardware monitoring tools at the compute subsystem 705 (e.g., by hardware agents (e.g., MCU agent 815) or other tools on the compute subsystem 705), and these results may be reported in data provided to the safety monitoring application 810 (e.g., through safety proxy 825 and application monitor framework 830) from the compute subsystem 705 for processing.

Generally, hardware monitors provided on the safety companion subsystem 710 or compute subsystem 705 may test and monitor the hardware components in the corresponding compute complex for hardware malfunctions. For instance, a hardware monitor (e.g., 835) may performs a periodic and run-time test of the compute complex hardware via one or more hardware monitoring interfaces. The hardware monitor (e.g., 835) reports malfunctions to the safety companion subsystem (e.g., via a safety proxy 825) for analysis and consideration by the safety monitor application (e.g., 810) as well as, in some cases, directly to in-vehicle user interfaces or even failover control logic (e.g., 750).

As with the compute subsystem 705, an API layer (e.g., embodied by APIs for the safety proxy (e.g., API 844), application monitor framework (e.g., API 846), safety companion hardware monitor 835 (e.g., API 848), etc.) may be provided to facilitate communication with the safety monitor application 810. The safety monitor application 810 may consume data collected from the compute subsystem 705 to detect instances where the compute subsystem reaches an anomalous or otherwise unexpected decision, reaches a possibly unsafe decision, or other decision, which has the potentially of immediately or later impacting the safety of a vehicle's operation. Depending on the nature and frequency of the error(s) determined from the data by the safety monitor application 810, the safety monitor application 810 may perform a variety of tasks in response to attempt to mitigate negative effects of the error(s). For instance, some serious errors may result in the safety monitor application 810 taking action in response to a single detected instance of the error and other less-serious or less-immediate errors resulting in action by safety monitor application 810 after a number of similar errors are detected and logged over a period of time, among other examples. For instance, the safety monitor application 810 may generate alerts (e.g., for presentation to a passenger or as a report to an external safety or quality control system), may negate or override a determination made or signal sent by the automated driving application 805 that the safety companion 710 determines would result in an unsafe action, or invoke local failover control logic (e.g., 750) or external failover automated driving systems, among other example actions. In some cases, the safety monitor application 810 may initiate such actions further based on errors detected in the hardware (e.g., 720a,b) of the safety companion subsystem 710, even when no errors have been detected at the compute subsystem 705 (e.g., given that the failure to detect error may, in fact, be based on incorrect operation of the safety companion subsystem 710 itself), among other examples.

In some implementations, an example failover control system (e.g., 750) may be provided at the safety companion system 710 implementing logic executed by safety control subsystem 710 processing hardware to reliably implement failover safety actions such as initiate an automated pullover, automated braking, handover to a human user (e.g., within the vehicle or at a remote vehicle control service center), among other example features. In some implementations (e.g., as illustrated in FIG. 8), the safety companion subsystem 710 may implement a failover control to perform a degraded level of driving automation functionality. In other cases, failover automated driving logic may be provided additionally or alternatively by a subsystem separate from the safety companion subsystem 710. Generally, when safety monitor application 810 detects certain critical or repeated failures, the safety monitor application 810 can invoke failover driving control functionality to temporarily avoid unreasonable risk until a separate, more feature-rich failover system engages. Indeed, in some implementations, the safety monitor application 810 may determine whether a robust failover automated driving system is present on the vehicle and utilize such a system as a primary failover safety mechanism. In cases where no such failover system exists or if the failover system is determined to be unavailable, the failover control 750 of the safety companion system 710 may be instead utilized to bring the vehicle to a safe state (e.g., stopped in the lane or parked by the side of the road).

An example safety companion subsystem 710 may include additional components and elements to facilitate operation of the system and execution of safety monitor application(s) (e.g., 810) and functions. For instance, as shown in the example of FIG. 8, a safety companion subsystem 710 may include one or multiple hardware components (e.g., 720a,b) and supporting hypervisor, operating system, drivers, etc. (e.g., 860). Likewise, software-implemented components of the safety companion subsystem 710 may be supported by operating system abstraction logic (e.g., 854), hardware abstraction logic (e.g., 856), and other components. Likewise, implementations of an example compute subsystem (e.g., 705) may include corresponding hardware abstractions (e.g., 850) and operating system abstractions (e.g., 852), as well as corresponding operating systems, hypervisor, drivers, etc. (e.g., 858) for use with the hardware (e.g., 715b) of the compute subsystem 705, among other suitable implementations.

Given the independence and modularity of the safety companion subsystem 710 and compute subsystem 705, the systems may be developed and updated separately rather than monolithically. For instance, as enhancements to safety detection functionality are discovered, the safety monitor application of the safety companion may be updated (without disturbing the configuration of the compute system 705) to incorporate such functionality. Similarly, as updates are made to the automated driving application(s) of the compute subsystem 705, these can be made independent of the safety companion subsystem 710 (although some updates may involve updates to both subsystems. Additionally, the safety companion subsystem 710 may be implemented with a different architecture than the compute subsystem. For instance, hardware, operating systems, kernels, drivers, etc. (e.g., 860) used in the safety companion subsystem 710 may be outfitted with features and functionality to enable the safety companion subsystem 710 to deliver and implement higher safety levels (e.g., in compliance with requirements specified by an industry body or other standards organization to which the automated driving system may be beholden), whereas similar features may be omitted from analogous elements of the compute subsystem 705. In one example, a virtual machine monitor may be utilized for managing the co-existence of safety-related and non-safety-related applications. As another example, an operating system utilized by the safety companion system may be of appropriate ASIL capability, which may be optionally utilized in the compute subsystem, among other examples. Indeed, architectural diversity may provide redundancy and fallback support, while securing the automated driving system against a bug in one subsystem's architecture affecting the entirety of the system, among other example benefits.

According to some standards, it may be assumed that the automated driving system conducts all or part of the dynamic driving task on a sustained basis to satisfy driving automation levels L3, L4, and L5. Dynamic driving tasks of the automated driving system may include operational and tactical functions required to operate a vehicle in on-road traffic, including but not limited to lateral vehicle motion control via steering (operational); longitudinal vehicle motion control via acceleration and deceleration (operational); monitoring the driving environment via object and event detection, recognition, classification, and response preparation (operational and tactical); monitoring the vehicle status (sensor status, lateral and longitudinal status); object and event response execution (operational and tactical); maneuver planning (tactical); and enhancing conspicuity via lighting, signaling and gesturing, etc. (tactical). In some implementations, once the automated driving system is enabled all elements of the system may be correctly initialized. It may be assumed that no actuation commands should originate from the automated driving system until the automated driving system is requested by the (local or remote) driver to perform dynamic driving tasks. After initialization is complete, sensors are used to obtain information from the environment surrounding the vehicle and the vehicle itself, in order to provide the data for the implemented vehicle functions of the automated driving system. Sensor data is received and processed by the automated driving system to generate commands for the actuators.

As noted above, in some implementations, the safety companion subsystem may be configured with a higher ASIL than the compute subsystem. In one implementation, an example automated driving system of SAE level L3, L4, or L5, may be tasked with performing all or part of the dynamic driving tasks on a sustained basis, over an operational design domain. The hazardous events, which may be encountered and classified by the automated driving system may have exposure, controllability and severity assumed as follows:

Exposure: High probability
Controllability: Difficult to control or uncontrollable
Severity: Life-threatening injuries (survival uncertain), fatal injuries In such an implementation, the automated driving system may be targeted to manage hazardous events and realize safety goals up to ASIL D. A set of assumed safety goals suitable for the processing element may be derived from these sample hazards. For instance: the automated driving system shall avoid, detect, or control failure modes leading to the use of faulty data from the sensor element(s); the automated driving system shall avoid, detect, or control failure modes leading to faulty data processing; and the automated driving system shall avoid, detect, or control failure modes leading to the transmission of unintended commands to the actuator element(s), among other examples.

Figure 9:
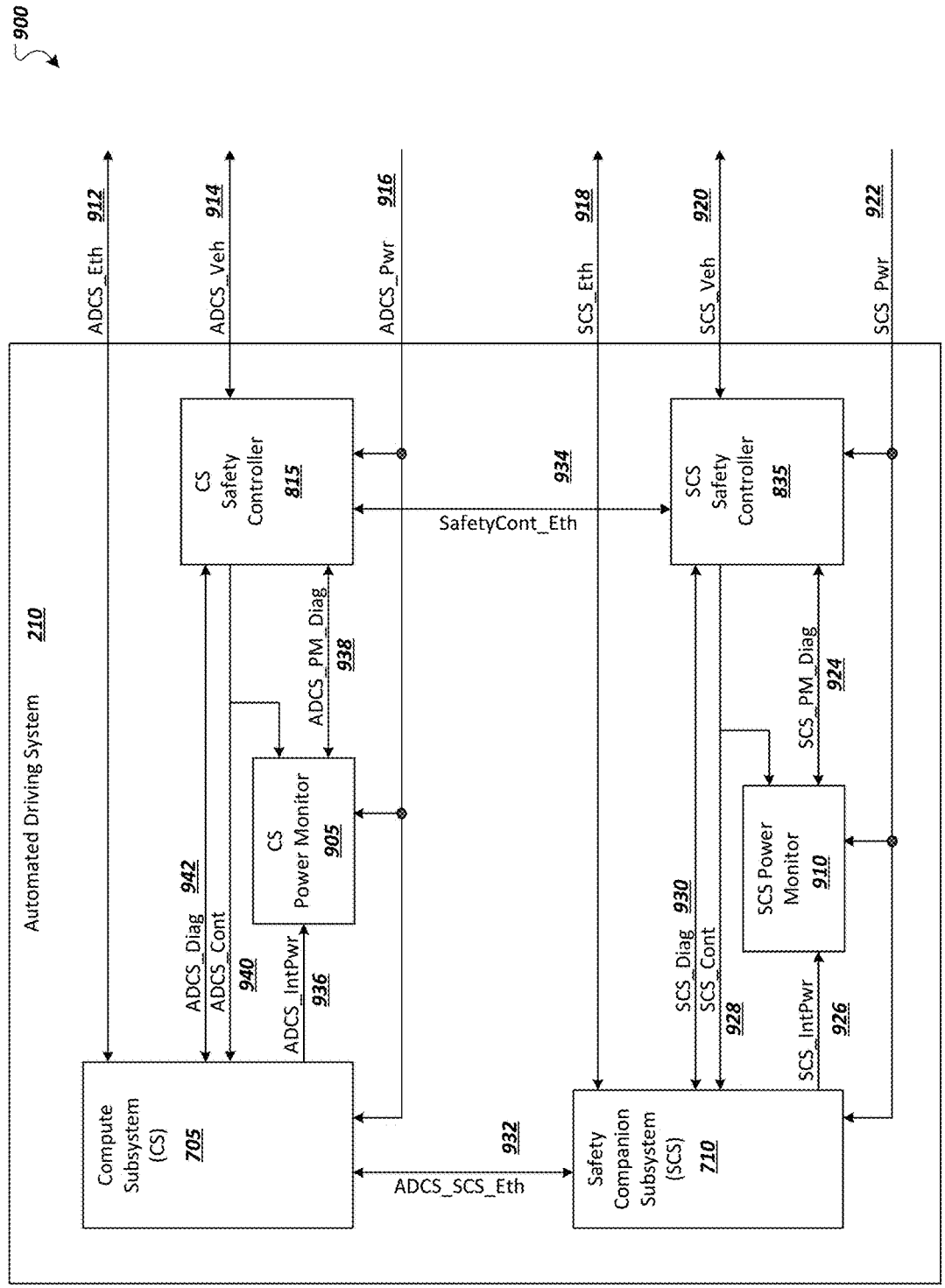
FIG. 9 is a simplified block diagram illustrating example interfaces of an automated driving system.

As discussed herein, an automated driving system may include a compute subsystem and a safety companion subsystem, which may each be connected through various interfaces to each other as well as other components of the system, including various sensors and actuators of the system, as well as failover automated driving subsystems. Generally, the compute subsystem processes sensor information and generates actuation commands. The safety companion subsystem detects and reports failures in the compute subsystem. Turning to FIG. 9, an example implementation of an automated driving system 210 is shown including the interfaces (e.g., 912, 914, 916, 918, 920, 922, 924, 926, etc.), which may be utilized to connect hardware elements of the compute subsystem 705 and safety companion subsystem 710 with each other (as well as sub-components, such as hardware monitors (e.g., MCU Agent 815, safety companion hardware monitor 835, etc.), power monitors for the subsystem (e.g., compute subsystem power monitor 905, safety companion subsystem power monitor 910)), and other components of the automated driving system 210, such as power systems, sensors, actuators, etc. As one example, the safety companion element 710 may generate signals to identify the status of the compute subsystem and automated driving system 210 generally, as well as status of a failover driving system of the system, for instance, using the status of automated driving system and failover automated driving subsystem using an interface, including reporting failure conditions. A control interface may be provided and used to control the operating state of the automated driving system 210 and/or failover driving system, including enabling or disabling the automated driving system 210 and switching to the failover driving system when needed.

The safety companion subsystem 710 may receive status information from the automated driving system 210 and switching to the failover driving system and may effectively control operation of the compute subsystem and failover driving subsystem. The compute subsystem provides automated driving system status information through one or more of the interfaces, the information including failures reported within the automated driving system, its elements and interfaces. The compute subsystem also receives automated driving system control information on one or more of the interfaces, which includes commands such as enabling, disabling, and testing the automated driving system. It is the responsibility of the safety companion subsystem to enable compute subsystem and the failover automated driving subsystem, based on the failure conditions reported by these two elements. The safety companion subsystem disables the automated driving system when a failure is reported by the compute subsystem and performs the dynamic driving task fallback using the fallback element failover automated driving subsystem. Additionally, the safety companion subsystem should control command interfaces of the compute subsystem to potentially disable such interfaces to prevent the automated driving system from continuing to issue commands to the actuators when a failure has been detected in compute subsystem.

In instances where the safety companion subsystem 710 has commanded the failover automated driving subsystem to perform dynamic driving task fallback, the safety companion subsystem 710 can command the compute subsystem 705 to perform offline testing. If the compute subsystem passes offline testing, the safety companion subsystem can bring the compute subsystem back into service (e.g., and disengage the failover subsystem). If the compute subsystem 705 fails or doesn't complete offline testing, there may be no further fault tolerance available to the automated driving system unless additional fallback elements are available. If no further fault tolerance is available, the safety companion subsystem 710, in some implementations, will command the fallback element failover automated driving subsystem to bring the vehicle to a safe state. The performance of the automated driving system to conduct the dynamic driving task can be scaled by adding additional compute subsystems in some implementations. Each of the multiple compute subsystems, in some implementations, may interface to the same safety companion subsystem (e.g., 710).

In some implementations, a failover automated driving subsystem may be implemented separate from the compute subsystem 705 and may provide dynamic driving task fallback for the automated driving system in the event the automated driving system 210 has a failure and a fail operational system is required (e.g.; for a L4 or L5 automated driving system). The fallback element failover automated driving subsystem may be implemented as a standby element. Given acceptable fault tolerant time interval (FTTI) ratings maintained for automated driving systems and the considerable amount of state and history that would likely be used by the fallback element to perform the dynamic driving task, in some implementations, the failover automated driving subsystem may be implemented as a hot standby. In this manner, the automated driving system and the failover automated driving subsystem run simultaneously and process the same information. The fallback element may be able to provide the same intended functionality as the automated driving system or a reduced form of intended functionality, depending on the degradation capability required of the automated driving system. Additionally, there may be one or more such fallback elements/subsystems based on the implementation. The fallback failover automated driving subsystem processes sensor information from sensor interfaces of the system and delivers actuation commands using actuator interfaces. This activity may be done concurrently with the operation of automated driving system to provide a hot standby. The safety companion subsystem 710 may utilize one or more control interfaces to control the state of the failover driving subsystem, including enabling or disabling the failover driving subsystem. The failover automated driving subsystem may provide status information to the safety companion subsystem using a dedicated interface. The safety companion subsystem performs diagnostics of the failover automated driving subsystem also using a corresponding interface. In some implementations, the functionality of safety companion subsystem may be at least partially merged, or combined, with that of the failover automated driving subsystem, so long as sufficient independence from compute subsystem failures is maintained. This combination may be advantageous in some instances to reduce delays between the detection of a failure in the compute subsystem to the activation of the dynamic driving task fallback, among other example alternatives and advantages.

In one example implementation, the automated driving system 210 may be implemented to support automated driving system safety goals up to ASIL D. As discussed herein, in some implementations, the compute subsystem, by itself, may be configured to achieve safety goals beneath this objective, relying on the enhanced safety features of the cooperating safety companion subsystem to achieve the requisite safety goals set for the system. As noted above, respective hardware monitors may be provided to monitor hardware of both the compute subsystem and the safety companion subsystem and may deliver data describing conditions in the hardware to the safety companion subsystem software for processing and potential remedial action. For instance, the hardware monitors may be configured to provide diagnostic coverage with respect to residual faults 99% and diagnostic coverage with respect to latent faults 90% (e.g., at each of the safety companion subsystem hardware and compute subsystem hardware). In one example, the target value for safety goal violations due to random hardware failures (e.g., in the aggregate hardware of the automated driving system) may be a targeted maximum contribution of $10^{-9}$ per hour (10 failures in time (FIT)) to the probability of violating a safety goal due to random hardware failures (e.g., including safe faults and residual faults detected using hardware monitors of the system).

Additional safety measures may be implemented using a safety companion subsystem in order to reach the desired ASIL or other goal, utilizing the safety (e.g., ASIL) capability of the safety companion subsystem (and compute subsystem). For instance, the safety companion subsystem may be utilized to perform or support performance (by the compute subsystem or other components of the automated driving system) of various technical safety requirements (TSRs) (e.g., TSRs defined in ISO 26262-4, Road Vehicles—Functional Safety). For instance, the safety companion subsystem may detect and control failures relating to the calibration of the compute subsystem (e.g., including maintenance of corresponding calibration data), failures relating to unintended or incorrect transitions between operating modes of the automated driving system (e.g., operating mode transitions of the compute subsystem or failover driving subsystems), failures pertaining to safe states defined for the compute subsystem, failures pertaining to interfaces used by the compute subsystem or safety companion subsystem, power failures (e.g., detected by power monitors of the compute or safety companion subsystems), and voltage failures (e.g., over- or under-voltage conditions). Additional TSRs satisfied using the safety companion subsystem may include detecting and controlling failures relating to incorrect debug use by the compute subsystem, failures in compliance with detection and reaction time thresholds, failures relating to user warnings (e.g., to be delivered through in-vehicle user interfaces), failures relating to manual (local or remote) handoff by the automated driving system, memory errors (e.g., corrupting error data detected by hardware monitors, configuration data, etc.), hardware errors (e.g., direct memory access (DMA) errors, interface bit errors, memory management, interrupt handling, etc.), as well as failures pertaining to incorrect driving decisions or actuations determined by the compute subsystem (e.g., as discussed above), among other examples. Failures may be identified and controlled through the exchange of safety-related information using one or more interfaces of the automated driving system interface that are configured to ensure against loss of communication, message corruption, unacceptable message delay, message loss, unintended message repetition, incorrect message sequencing, message insertion, message masquerading, and incorrect message addressing, among other enhanced features to guard the integrity of these interfaces and the signals they carry, among other examples.

Figure 10:
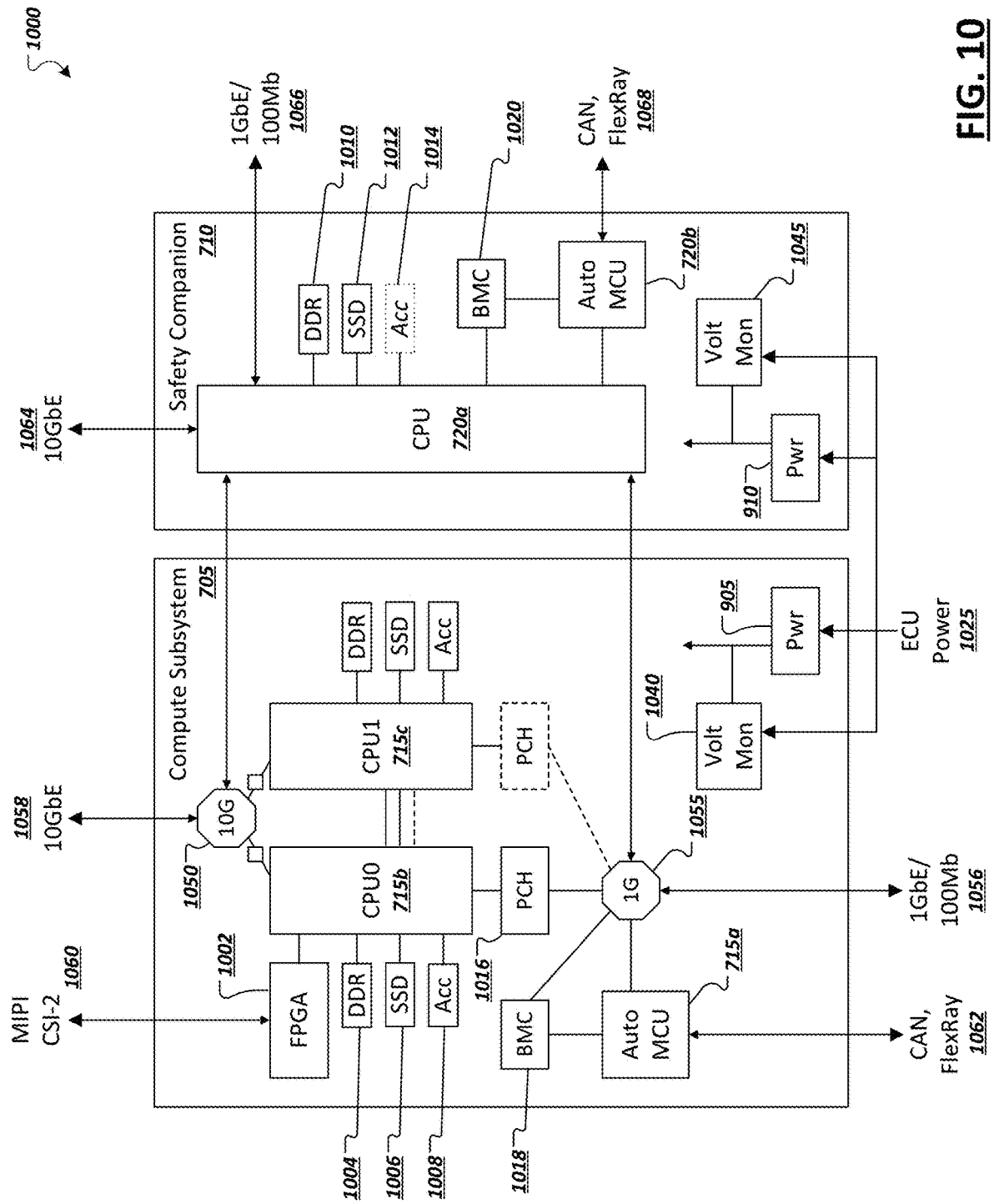
FIG. 10 is a simplified block diagram illustrating hardware of an example automated driving system.

Turning to FIG. 10, a simplified block diagram is presented illustrating an example implementation of automated driving system hardware in a system including a compute subsystem 705 operating in connection with a safety companion subsystem 710. In this example, compute subsystem 705 may include a pair of interconnected central processing units (CPUs) 715b,c to implement a central processing functionality as well as an automotive MCU 715a to perform automated driving system tasks. Each of the CPUs 715b,c may include double data rate (DDR) and solid state drive (SSD) memory elements (e.g., 1004, 1006), one or more cooperating accelerator devices (e.g., 1008), and potentially other supporting processing elements (e.g., field programmable gate array (FPGA) 1002). A baseboard management controller (BMC) 1018 may be coupled to the MCU 715a (and similarly a BMC device 1020 may couple to the MCU 720b of the safety companion system. Switching circuitry (e.g., 1050, 1055) may be provided to facilitate communication between elements of the compute subsystem 705, safety companion subsystem 710, and other components (e.g., actuators, sensors, and subsystems) of the vehicle (e.g., using interfaces 1056, 1058, 1060, 1062, 1064, 1066, 1068 according to one or a variety of communication technologies (e.g., Ethernet, MIPI, CAN, FlexRay, etc.). In some implementations, processors (e.g., 715b,c) may be coupled to switching fabrics by way of a platform controller hub (PCH) (e.g., 1016), among other example implementations.

The safety companion subsystem may be implemented utilizing a different architecture (and may even be provided by a separate provider or vendor), thereby providing architectural diversity and guarding against bugs or defects in one subsystem 705, 710 affecting the entirety of the automated driving system. In one example, the safety companion subsystem 710 may utilize a CPU processor 720 coupled to one or more memory elements (e.g., 1010, 1012) and one or more hardware accelerator devices (e.g., 1014, which may differ from the accelerators utilized in the compute subsystem 705). The safety companion subsystem 710 may also include an automotive MCU 720b (e.g., the same or different from the MCU 715a of the compute subsystem 705), which, together with CPU 720a may be coupled to BMC 1020, among other example components.

As shown in the example of FIG. 10, in some implementations, power may be provided to the compute subsystem 705 and safety companion subsystem 710 from a common power source (e.g., delivered through engine control unit (ECU) power 1025). In some instances, each of the compute subsystem 705 and safety companion subsystem 710 may be provided with a respective power monitor (e.g., 905, 910) to detect whether the subsystem is sufficiently powered. Power status and events may be reported by the power monitor circuitry (e.g., 905, 910) and used as additional inputs by the safety companion subsystem in determining correct operation of the compute subsystem and/or as an input to failover systems (e.g., when the safety companion subsystem loses power). Similarly, separate voltage monitor circuitry (e.g., 1040, 1045) may monitor voltage conditions at each of the corresponding compute subsystem 705 or safety companion subsystem 710 and signal the detected occurrence of under- or over-voltage events within the subsystems (e.g., to be consumed by the safety companion subsystem software or failover systems, as the case may be), among other example features and components.

Figure 11:
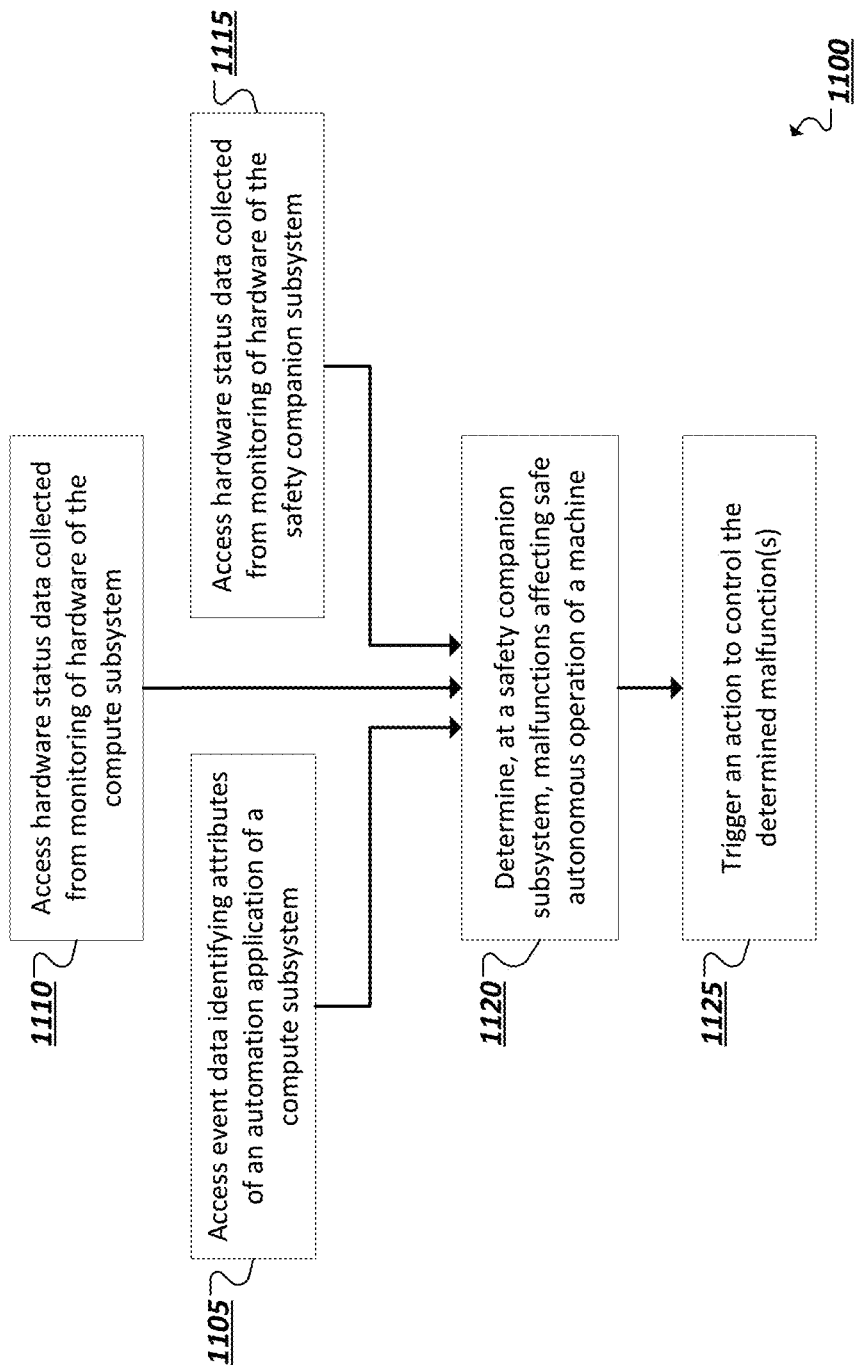
FIG. 11 is a flow diagram illustrating an example technique for providing safety in connection with autonomous operation of a machine.

It should be appreciated that, while many of the examples above focus on implementations of a safety companion subsystem within an automated driving system, that similar architectures (employing a compute subsystem and an independent higher-security-level safety companion subsystem) may be utilized in other machine automation systems, such as industrial or personal robots, drones, and other autonomous (or semi-autonomous) machines to facilitate safe operation of the machine. For instance, FIG. 11 shows a flowchart 1100 illustrating an example technique for providing safety in connection with autonomous operation of a machine. For instance, event data may be generated in connection with decisions made by the compute subsystem in the course of its operation determining dynamic automated tasks to be physically implemented by the machine. The event data may be accessed 1105 by the safety companion subsystem (e.g., collected by an agent on the compute subsystem and passed to the safety component via an interface or broker component (e.g., safety proxy)) and assessed to determine (e.g., 1120) whether the decision is correct and safe or represents a malfunction by the software logic of the compute subsystem utilized to make the decision. Additionally (or alternatively), hardware status data may be generated (e.g., by a hardware monitor on the compute subsystem) to identify attributes of the hardware of the compute subsystem. Such data may also be accessed 1110 by logic of the safety companion subsystem to detect (e.g., 1120) malfunctions (in the compute subsystem hardware) that implicate the safety of the machine automation tasks determined by the compute subsystem (e.g., using the malfunctioning hardware). Still further, in some implementations, a hardware monitor may be provided to monitor the safety companion subsystem's own hardware (which is distinct from the hardware of the compute subsystem) to detect malfunctions, which may undermine the safety functionality to be provided by the higher-security-level (e.g., higher ASIL) safety companion subsystem (using its hardware). Accordingly, a safety companion subsystem may likewise access such hardware status data (at 1115) and determine (at 1120) malfunctions originating at the safety companion subsystem, which may jeopardize the safe operation of the system. Based on such malfunctions, the safety companion subsystem may trigger 1125 one or more actions to control the determined malfunction(s). The actions may be based on the severity and/or frequency of the malfunction, as well as the source of the malfunction. For instance, in some cases, the malfunction may cause an alert to be present, errors to be logged, or self-tests to be run (e.g., to verify and/or self-correct the identified error). In other cases, the malfunction may result in alternative automation logic being invoked to take over (e.g., temporarily) control of the machine's automation. In cases where a critical malfunction is detected at the safety companion subsystem itself, failover systems may be employed (e.g., based on the assumption that safe operation of the machine can no longer be guaranteed in light of the integrity of the safety companion subsystem being compromised), among other example features and implementations.

Figure 12:
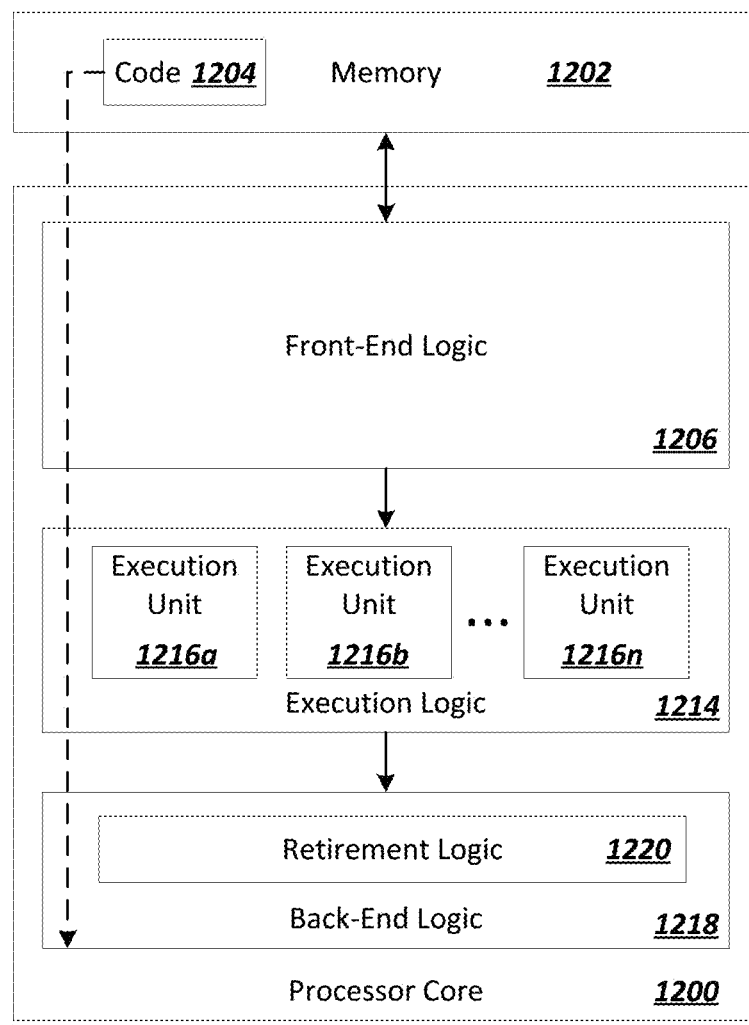
FIG. 12 is a block diagram of an exemplary processor in accordance with one embodiment.
Figure 13:
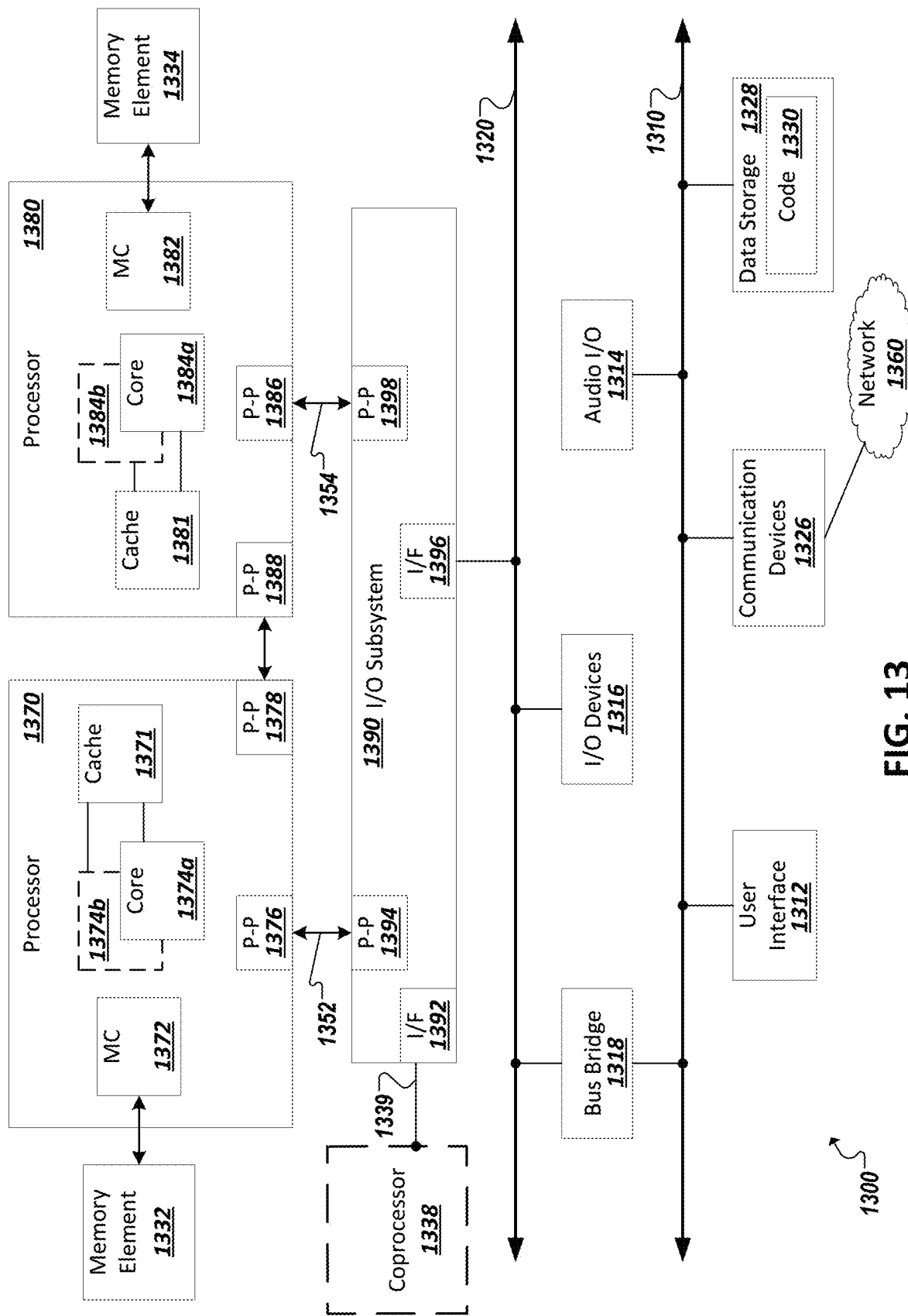
FIG. 13 is a block diagram of an exemplary computing system in accordance with one embodiment.

FIGS. 12-13 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 12-13.

FIG. 12 is an example illustration of a processor according to an embodiment. Processor 1200 is an example of a type of hardware device that can be used in connection with the implementations above. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216*a*, 1216*b*, 1216*n*, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1200.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures herein. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a co-processor 1338, such as a high-performance graphics circuit, machine learning accelerator, or other co-processor 1338, via an interface 1339, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is an apparatus including: a security companion subsystem of an automated driving system of a vehicle, the security companion subsystem including: a first processor device; first memory; one or more interfaces to couple the security companion subsystem to a compute subsystem of the automated driving system; a safety monitor, executed by the first processor device, to: access data generated at the compute subsystem, where the data indicates a determination by the compute subsystem associated with an automated driving task to be performed by the automated driving system, where the determination is made by an automated driving application executed by a different, second processor device on the compute subsystem; and determine whether the determination is safe based on the data, where the security companion subsystem is configured to realize a higher safety integrity level than the compute subsystem.

Example 2 includes the subject matter of example 1, where the safety monitor is further to trigger an action to control the automated driving task based on a safety determination that the determination is unsafe.

Example 3 includes the subject matter of example 2, where the action replaces the automated driving task with a different automated driving task, and the security companion subsystem is to send a signal to one or more actuators of the vehicle to cause the different automated driving task to be performed based on the safety determination.

Example 4 includes the subject matter of example 2, where the action includes passing control of automated driving tasks from the compute subsystem to different automated driving functionality on the automated driving system, where the different automated driving functionality is to be executed to bring the vehicle to a safe physical state.

Example 5 includes the subject matter of example 4, where the safety companion subsystem includes the different automated driving functionality and the different automated driving functionality is executed by the first processor device.

Example 6 includes the subject matter of example 4, where the different automated driving functionality is provided on a failover automated driving subsystem separate from the security companion subsystem and compute subsystem of the automated driving system.

Example 7 includes the subject matter of any one of examples 1-6, where the determination includes at least one of an object detection determination, an object classification determination, a path planning determination, a vehicle state determination, a localization determination, or a motion planning determination made by the automated driving application, where the automated driving task is based on the determination.

Example 8 includes the subject matter of any one of examples 1-7, where the safety monitor is further to: receive hardware monitoring data, where the hardware monitoring data identifies events detected on hardware of the compute subsystem associated with automated driving tasks to be determined by the compute subsystem; detect a failure in the hardware of the compute subsystem based on the hardware monitoring data; and perform an action to control effects associated with the failure.

Example 9 includes the subject matter of example 8, where the security companion subsystem further includes a safety companion hardware monitor to monitor operation of hardware of the safety companion subsystem including the first processor device, where the safety companion hardware monitor is to generate second hardware monitoring data to describe attributes of the hardware of the safety companion subsystem, and the safety monitor is further to: detect failures of the hardware of the safety companion subsystem based on the second hardware monitoring data; and disable at least a portion of the automated driving system based on a detected failure of the hardware of the safety companion subsystem.

Example 10 includes the subject matter of any one of examples 1-9, where the safety monitor is further to detect failures associated with interfaces used to communicate signals associated with automated driving tasks determined by the compute subsystem.

Example 11 includes the subject matter of any one of examples 1-10, where the compute subsystem is responsible for consuming sensor data from the vehicle to determine automated driving tasks for the vehicle and the safety companion subsystem is responsible for maintaining safety of the automated driving system by detecting malfunctions of the compute subsystem.

Example 12 includes the subject matter of any one of examples 1-11, where the higher safety integrity level includes an automotive safety integrity level (ASIL).

Example 13 includes the subject matter of any one of examples 1-12, where the safety companion subsystem further includes a safety proxy to: receive safety event data from the compute subsystem, where the data includes safety event data; determine integrity of the safety event data; and provide a subset of the safety event data on demand to the safety monitor in association with consumption of the subset of the safety event data by the safety monitor to determine malfunctions of the compute subsystem.

Example 14 includes the subject matter of any one of examples 1-13, where the first processor device includes a first automotive microcontroller and the second processor device includes a separate, second automotive microcontroller.

Example 15 is at least one non-transitory, machine readable storage medium with instructions stored thereon, where the instructions are executable by a machine to cause the machine to: access event data at a safety companion subsystem of an automated driving system, where the event data is generated at a compute subsystem of the automated driving system, and the event data indicates a determination by the compute subsystem associated with an automated driving task; access, at the safety companion subsystem, first hardware monitoring data captured at the compute subsystem to indicate attributes of hardware of the compute subsystem; access second hardware monitoring data captured at the safety companion subsystem to indicate attributes of hardware of the safety companion subsystem, where the hardware of the safety companion subsystem is distinct from the hardware of the compute subsystem; determine, at the safety companion subsystem, malfunctions capable of affecting safety of automated driving tasks of the automated driving system based on one or more of the event data, first hardware monitoring data, or second hardware monitoring data; and trigger an action to control a malfunction determined by the safety companion subsystem.

Example 16 includes the subject matter of example 15, where the action replaces the automated driving task with a different automated driving task, and the security companion subsystem is to send a signal to one or more actuators of a vehicle to cause the different automated driving task to be performed based on the malfunction.

Example 17 includes the subject matter of example 15, where the action includes passing control of automated driving tasks from the compute subsystem to different automated driving functionality on the automated driving system, where the different automated driving functionality is to be executed to bring the vehicle to a safe physical state.

Example 18 includes the subject matter of example 17, where the safety companion subsystem includes the different automated driving functionality and the different automated driving functionality is executed by the first processor device.

Example 19 includes the subject matter of example 17, where the different automated driving functionality is provided on a failover automated driving subsystem separate from the security companion subsystem and compute subsystem of the automated driving system.

Example 20 includes the subject matter of any one of examples 15-19, where the determination includes at least one of an object detection determination, an object classification determination, a path planning determination, a vehicle state determination, a localization determination, or a motion planning determination made by the automated driving application, where the automated driving task is based on the determination.

Example 21 includes the subject matter of any one of examples 15-20, where the instructions are further executable to cause the machine to detect, at the safety companion subsystem, failures associated with interfaces used to communicate signals associated with automated driving tasks determined by the compute subsystem.

Example 22 includes the subject matter of any one of examples 15-21, where the compute subsystem is responsible for consuming sensor data from a vehicle to determine automated driving tasks for the vehicle and the safety companion subsystem is responsible for maintaining safety of the automated driving system by detecting malfunctions of the compute subsystem.

Example 23 includes the subject matter of any one of examples 15-22, where the security companion subsystem implements a higher safety integrity level than the compute subsystem.

Example 24 includes the subject matter of example 23, where the higher safety integrity level includes an automotive safety integrity level (ASIL).

Example 25 includes the subject matter of any one of examples 15-24, where the instructions are further executable to cause the machine to: receive particular data, at a safety proxy element of the safety companion subsystem, where the particular data includes one or more of the event data, first hardware monitoring data, and second hardware monitoring data; determine integrity of the particular data; and provide a subset of the particular data on demand to safety companion subsystem logic in association with consumption of the subset of the safety event data by the safety companion subsystem logic to determine malfunctions of the compute subsystem.

Example 26 includes the subject matter of any one of examples 15-25, where the safety companion subsystem includes a first processor device and the compute subsystem includes a separate, second processor device.

Example 27 includes the subject matter of example 26, where the first processor device includes a first automotive microcontroller and the second processor device includes a separate, second automotive microcontroller.

Example 28 is a method including: accessing event data at a safety companion subsystem of an automated driving system, where the event data is generated at a compute subsystem of the automated driving system, and the event data indicates a determination by the compute subsystem associated with an automated driving task; accessing, at the safety companion subsystem, first hardware monitoring data captured at the compute subsystem to indicate attributes of hardware of the compute subsystem; accessing second hardware monitoring data captured at the safety companion subsystem to indicate attributes of hardware of the safety companion subsystem, where the hardware of the safety companion subsystem is distinct from the hardware of the compute subsystem; determining, at the safety companion subsystem, malfunctions capable of affecting safety of automated driving tasks of the automated driving system based on one or more of the event data, first hardware monitoring data, or second hardware monitoring data; and triggering an action to control a malfunction determined by the safety companion subsystem.

Example 29 includes the subject matter of example 28, where the action replaces the automated driving task with a different automated driving task, and the security companion subsystem is to send a signal to one or more actuators of a vehicle to cause the different automated driving task to be performed based on the malfunction.

Example 30 includes the subject matter of example 28, where the action includes passing control of automated driving tasks from the compute subsystem to different automated driving functionality on the automated driving system, where the different automated driving functionality is to be executed to bring the vehicle to a safe physical state.

Example 31 includes the subject matter of example 30, where the safety companion subsystem includes the different automated driving functionality and the different automated driving functionality is executed by the first processor device.

Example 32 includes the subject matter of example 30, where the different automated driving functionality is provided on a failover automated driving subsystem separate from the security companion subsystem and compute subsystem of the automated driving system.

Example 33 includes the subject matter of any one of examples 28-32, where the determination includes at least one of an object detection determination, an object classification determination, a path planning determination, a vehicle state determination, a localization determination, or a motion planning determination made by the automated driving application, where the automated driving task is based on the determination.

Example 34 includes the subject matter of any one of examples 28-33, further including detecting, at the safety companion subsystem, failures associated with interfaces used to communicate signals associated with automated driving tasks determined by the compute subsystem.

Example 35 includes the subject matter of any one of examples 28-34, where the compute subsystem is responsible for consuming sensor data from a vehicle to determine automated driving tasks for the vehicle and the safety companion subsystem is responsible for maintaining safety of the automated driving system by detecting malfunctions of the compute subsystem.

Example 36 includes the subject matter of any one of examples 28-35, where the security companion subsystem implements a higher safety integrity level than the compute subsystem.

Example 37 includes the subject matter of example 36, where the higher safety integrity level includes an automotive safety integrity level (ASIL).

Example 38 includes the subject matter of any one of examples 28-37, further including: receiving particular data, at a safety proxy element of the safety companion subsystem, where the particular data includes one or more of the event data, first hardware monitoring data, and second hardware monitoring data; determining integrity of the particular data; and providing a subset of the particular data on demand to safety companion subsystem logic in association with consumption of the subset of the safety event data by the safety companion subsystem logic to determine malfunctions of the compute subsystem.

Example 39 includes the subject matter of any one of examples 28-38, where the safety companion subsystem includes a first processor device and the compute subsystem includes a separate, second processor device.

Example 40 includes the subject matter of example 39, where the first processor device includes a first automotive microcontroller and the second processor device includes a separate, second automotive microcontroller.

Example 41 is a system including means to perform the method of any one of examples 28-40.

Example 42 is a system including: a compute subsystem including: a first microcontroller; first memory; an automation engine executable by the first microcontroller to: receive sensor data; and determine an automated task to be performed by a machine based on the sensor data; a safety companion subsystem including: a second microcontroller; second memory; a safety monitor executable by the second microcontroller to: access event data to identify attributes of the compute subsystem associated with determination of the automated task; determine a malfunction of the compute subsystem based on the event data; and cause an action to be performed to control safety of the machine based on the determined malfunction, where the security companion subsystem implements a higher safety integrity level than the compute subsystem.

Example 43 includes the subject matter of example 42, where the compute subsystem further includes a first hardware monitor to monitor hardware of the compute subsystem to detect malfunctions of the hardware of the compute subsystem and generate first status data based on monitoring of the hardware of the compute subsystem, where the safety monitor is further to: access the first status data; and determine that a hardware malfunction of the hardware of the compute subsystem affects safety of the machine based on the first status data.

Example 44 includes the subject matter of example 43, where the safety companion subsystem further includes a second hardware monitor to monitor hardware of the safety companion subsystem to detect malfunctions of the hardware of the safety companion subsystem and generate second status data based on monitoring of the hardware of the safety companion subsystem, where the safety monitor is further to: access the second status data; and determine that a hardware malfunction of the hardware of the safety companion subsystem affects safety of the machine based on the second status data.

Example 45 includes the subject matter of any one of examples 42-44, where the action replaces the automated task with a different automated task, and the security companion subsystem is to send a signal to one or more actuators of the machine to cause the different automated task to be performed based on the safety determination.

Example 46 includes the subject matter of any one of examples 42-44, where the action includes passing control of automated tasks from the compute subsystem to different automation functionality on the automated system, where the different automation functionality is to be executed to bring the machine to a safe physical state.

Example 47 includes the subject matter of example 46, where the safety companion subsystem includes the different automation functionality and the different automation functionality is executed by the first processor device.

Example 48 includes the subject matter of example 46, where the different automation functionality is provided on a failover automation subsystem separate from the security companion subsystem and compute subsystem of the automation system.

Example 49 includes the subject matter of any one of examples 42-48, where the determination of the automated task includes at least one of an object detection determination, an object classification determination, a path planning determination, a machine state determination, a localization determination, or a motion planning determination made by the compute subsystem, where the automated task is based on the determination of the automated task.

Example 50 includes the subject matter of any one of examples 42-49, where the safety monitor is further to: receive hardware monitoring data, where the hardware monitoring data identifies events detected on hardware of the compute subsystem associated with automation tasks to be determined by the compute subsystem; detect a failure in the hardware of the compute subsystem based on the hardware monitoring data; and perform an action to control effects associated with the failure.

Example 51 includes the subject matter of example 50, where the safety companion subsystem further includes a safety companion hardware monitor to monitor operation of hardware of the safety companion subsystem including the first processor device, where the safety companion hardware monitor is to generate second hardware monitoring data to describe attributes of the hardware of the safety companion subsystem, and the safety monitor is further to: detect failures of the hardware of the safety companion subsystem based on the second hardware monitoring data; and disable at least a portion of the automated driving system based on a detected failure of the hardware of the safety companion subsystem.

Example 52 includes the subject matter of any one of examples 42-51, where the safety monitor is further to detect failures associated with interfaces used to communicate signals associated with automation tasks determined by the compute subsystem.

Example 53 includes the subject matter of any one of examples 42-52, where the compute subsystem is responsible for consuming sensor data from the machine to determine automation tasks for the machine and the safety companion subsystem is responsible for maintaining safety of the automated system by detecting malfunctions of the compute subsystem.

Example 54 includes the subject matter of any one of examples 42-53, where the safety companion subsystem further includes a safety proxy to: receive safety event data from the compute subsystem, where the data includes safety event data; determine integrity of the safety event data; and provide a subset of the safety event data on demand to the safety monitor in association with consumption of the subset of the safety event data by the safety monitor to determine malfunctions of the compute subsystem.

Example 55 includes the subject matter of any one of examples 42-54, further including the machine, where the machine includes a passenger vehicle.

Example 56 includes the subject matter of example 55, where the higher safety integrity level includes an automotive safety integrity level (ASIL).

Example 57 includes the subject matter of any one of examples 55-56, where the first processor device includes a first automotive microcontroller and the second processor device includes a separate, second automotive microcontroller.

Example 58 includes the subject matter of any one of examples 42-54, further including the machine, where the machine includes a robot.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An apparatus comprising:
   a security companion subsystem of an automated driving system of a vehicle, the security companion subsystem comprising:
   a first processor device;
   first memory;
   one or more interfaces to couple the security companion subsystem to a compute subsystem of the automated driving system;
   a safety monitor, executed by the first processor device, to:
   access data generated at the compute subsystem, wherein the data corresponds to a determination by the compute subsystem associated with an automated driving task to be performed by the vehicle as directed by the automated driving system, wherein the determination is made by an automated driving application executed by a second processor device on the compute subsystem, wherein the second processor device is separate and independent from the first processor device;
   detect a fault in the compute subsystem based on the data; and
   trigger an action, based on the fault, to cause the automated driving task to be safely performed,
   wherein an overall safety integrity rating for the security companion subsystem is higher than an overall safety integrity rating for the compute subsystem based on characteristics of hardware of the security companion subsystem.

2. The apparatus of claim 1, wherein the safety monitor is further to trigger an action to comprises autonomous control of the automated driving task based on a safety determination by the safety monitor that the determination is unsafe.

3. The apparatus of claim 2, wherein the action replaces the automated driving task with a different automated driving task, and the security companion subsystem is to send a signal to one or more actuators of the vehicle to cause the different automated driving task to be performed based on the safety determination.

4. The apparatus of claim 2, wherein the action comprises passing control of automated driving tasks from the compute subsystem to different automated driving functionality on the automated driving system, wherein the different automated driving functionality is to be executed to bring the vehicle to a safe physical state.

5. The apparatus of claim 4, wherein the security companion subsystem comprises the different automated driving functionality and the different automated driving functionality is executed by the first processor device.

6. The apparatus of claim 4, wherein the different automated driving functionality is provided on a failover automated driving subsystem separate from the security companion subsystem and compute subsystem of the automated driving system.

7. The apparatus of claim 1, wherein the determination comprises at least one of an object detection determination, an object classification determination, a path planning determination, a vehicle state determination, a localization determination, or a motion planning determination made by the automated driving application, wherein the automated driving task is based on the determination.

8. The apparatus of claim 1, wherein the safety monitor is further to:
receive hardware monitoring data, wherein the hardware monitoring data identifies events detected on hardware of the compute subsystem associated with automated driving tasks to be determined by the compute subsystem;
detect the fault in the hardware of the compute subsystem based on the hardware monitoring data; and
perform an action to control effects associated with the failure.

9. The apparatus of claim 8, wherein the security companion subsystem further comprises a security companion hardware monitor to monitor operation of hardware of the security companion subsystem comprising the first processor device, wherein the security companion hardware monitor is to generate second hardware monitoring data to describe attributes of the hardware of the security companion subsystem, and the safety monitor is further to:
detect faults of the hardware of the security companion subsystem based on the second hardware monitoring data; and
disable at least a portion of the automated driving system based on a detected fault of the hardware of the security companion subsystem.

10. The apparatus of claim 1, wherein the safety monitor is further to detect faults associated with interfaces used to communicate signals associated with automated driving tasks determined by the compute subsystem.

11. The apparatus of claim 1, wherein the compute subsystem is responsible for consuming sensor data from the vehicle to determine automated driving tasks for the vehicle and the security companion subsystem is responsible for maintaining safety of the automated driving system by detecting faults of the compute subsystem.

12. The apparatus of claim 1, wherein the higher safety integrity level comprises an automotive safety integrity level (ASIL).

13. The apparatus of claim 1, wherein the security companion subsystem further comprises a safety proxy to:
receive safety event data from the compute subsystem, wherein the data comprises safety event data;
determine integrity of the safety event data; and
provide a subset of the safety event data on demand to the safety monitor in association with consumption of the subset of the safety event data by the safety monitor to determine malfunctions of the compute subsystem.

14. The apparatus of claim 1, wherein the first processor device comprises a first automotive microcontroller and the second processor device comprises a separate, second automotive microcontroller.

15. At least one non-transitory, machine readable storage medium with instructions stored thereon, wherein the instructions are executable by a machine to cause the machine to:
access event data at a safety companion subsystem of an automated driving system, wherein the event data is generated at a compute subsystem of the automated driving system, and the event data indicates a determination by the compute subsystem associated to be used to autonomously perform an automated driving task;
access, at the safety companion subsystem, first hardware monitoring data captured at the compute subsystem to indicate attributes of hardware of the compute subsystem;
access second hardware monitoring data captured at the safety companion subsystem to indicate attributes of hardware of the safety companion subsystem, wherein the hardware of the safety companion subsystem is distinct from the hardware of the compute subsystem, and an overall safety integrity rating for the safety companion subsystem is higher than an overall safety integrity rating for the compute subsystem based on characteristics of hardware of the safety companion subsystem;
determine, at the safety companion subsystem, one or more malfunctions of the compute subsystem capable of affecting safety of automated driving tasks of the automated driving system, wherein the malfunctions are determined based on one or more of the event data, first hardware monitoring data, or second hardware monitoring data; and
trigger an action to cause the automated driving task to be safely performed based on detection of the one or more malfunctions.

16. The storage medium of claim 15, wherein the compute subsystem determines the automated driving tasks, and the action to control the malfunction comprises handing control of automated driving tasks to another computing system of the automated driving system.

17. A system comprising:
a compute subsystem comprising:
a first microcontroller;
first memory;
an automation engine executable by the first microcontroller to:
receive sensor data; and
determine an automated task to be performed by a machine based on the sensor data; and
a safety companion subsystem comprising:
a second microcontroller separate and independent from the first microcontroller;
second memory;
a safety monitor executable by the second microcontroller to:
access event data to identify attributes of the compute subsystem associated with determination of the automated task;
determine a malfunction of the compute subsystem based on the event data; and
cause an action to be performed, based on the malfunction, to cause the automated task to be safely performed by the machine,
wherein an overall safety integrity rating for the safety companion subsystem is higher than an overall safety integrity rating for the compute subsystem based on characteristics of hardware of the safety companion subsystem.

18. The system of claim 17, wherein the compute subsystem further comprises a first hardware monitor to monitor hardware of the compute subsystem to detect malfunctions of the hardware of the compute subsystem and generate first status data based on monitoring of the hardware of the compute subsystem,
wherein the safety monitor is further to:
access the first status data; and
determine that a hardware malfunction of the hardware of the compute subsystem affects safety of the machine based on the first status data.

19. The system of claim 18, wherein the safety companion subsystem further comprises a second hardware monitor to monitor hardware of the safety companion subsystem to detect malfunctions of the hardware of the safety companion subsystem and generate second status data based on monitoring of the hardware of the safety companion subsystem,
wherein the safety monitor is further to:
access the second status data; and
determine that a hardware malfunction of the hardware of the safety companion subsystem affects safety of the machine based on the second status data.

20. The system of claim 17, further comprising the machine, wherein the machine comprises one of a vehicle or a robot.

\* \* \* \* \*